(12) United States Patent
Ito et al.

(10) Patent No.: US 9,564,645 B2
(45) Date of Patent: Feb. 7, 2017

(54) STORAGE CONTAINER FOR THIN LITHIUM-AIR CELL, AND CELL

(71) Applicant: National Institute for Materials Science, Tsukuba-shi, Ibaraki (JP)

(72) Inventors: Kimihiko Ito, Tsukuba (JP); Yoshimi Kubo, Tsukuba (JP)

(73) Assignee: NATIONAL INSTITUTE FOR MATERIALS SCIENCE, Tsukuba-shi, Ibaraki (JP)

( * ) Notice: Subject to any disclaimer, the term of this patent is extended or adjusted under 35 U.S.C. 154(b) by 255 days.

(21) Appl. No.: 14/358,885

(22) PCT Filed: Nov. 21, 2012

(86) PCT No.: PCT/JP2012/080149
§ 371 (c)(1),
(2) Date: Sep. 10, 2014

(87) PCT Pub. No.: WO2013/077350
PCT Pub. Date: May 30, 2013

(65) Prior Publication Data
US 2015/0024291 A1    Jan. 22, 2015

(30) Foreign Application Priority Data
Nov. 21, 2011   (JP) ................................ 2011-254162

(51) Int. Cl.
*H01M 8/04*   (2016.01)
*H01M 2/02*   (2006.01)
(Continued)

(52) U.S. Cl.
CPC ......... *H01M 8/04089* (2013.01); *H01M 2/024* (2013.01); *H01M 2/1016* (2013.01);
(Continued)

(58) Field of Classification Search
CPC ............ H01M 8/04089; H01M 8/0432; H01M 8/04753; H01M 8/0438; H01M 2/1016; H01M 2/024; H01M 2/345; H01M 2/34; H01M 2/1094; H01M 2/1072; H01M 2/0255; H01M 10/48; H01M 10/042; H01M 12/008; H01M 2200/00
See application file for complete search history.

(56) References Cited

U.S. PATENT DOCUMENTS

| | | | | |
|---|---|---|---|---|
| 2009/0023040 A1* | 1/2009 | Paik | .................. | H01M 8/04231 429/429 |
| 2010/0151336 A1* | 6/2010 | Nakanishi | ............... | H01M 6/14 429/407 |
| 2011/0195320 A1* | 8/2011 | Nishikoori | .......... | H01M 2/0255 429/403 |

FOREIGN PATENT DOCUMENTS

| | | |
|---|---|---|
| JP | A-2008-502118 | 1/2008 |
| JP | A-2010-192313 | 9/2010 |

(Continued)

OTHER PUBLICATIONS

Hiroaki Tagawa, "Solid oxide fuel cell and global environment", p. 60, 1998, Ange-shofu Publishing.
(Continued)

*Primary Examiner* — Ula C Ruddock
*Assistant Examiner* — Amanda Barrow
(74) *Attorney, Agent, or Firm* — Hoffman and Baron, LLP

(57) ABSTRACT

A containment vessel of a thin lithium-air battery with improved safety is provided. By using the containment vessel, an explosive reaction (ignition) of the electrolyte including lithium metal or ion can be suppressed. The containment vessel (1001) includes: a containment chamber (201) containing the thin lithium-air battery (101). It further includes: a first gas pipe (202B) and a second gas pipe
(Continued)

(202D) communicated with an inside of the containment chamber (201); a third gas pipe (202A) and a fourth gas pipe (202C) communicated with an inside of the thin lithium-air battery (101); and a valve (204C) that is provided to the third gas pipe (202A) and controls opening and closing of communication to the containment chamber (201), wherein an inert gas supply source is provided to the first gas pipe (202B), and an air or oxygen supply source is provided to the third gas pipe (202A).

15 Claims, 16 Drawing Sheets

(51) Int. Cl.
    *H01M 10/48*     (2006.01)
    *H01M 12/08*     (2006.01)
    *H01M 2/34*     (2006.01)
    *H01M 2/10*     (2006.01)
    *H01M 10/052*     (2010.01)

(52) U.S. Cl.
    CPC ........... *H01M 2/345* (2013.01); *H01M 2/348* (2013.01); *H01M 10/48* (2013.01); *H01M 12/08* (2013.01); *H01M 2/0255* (2013.01); *H01M 2/1072* (2013.01); *H01M 2/1094* (2013.01); *H01M 8/0432* (2013.01); *H01M 8/0438* (2013.01); *H01M 8/04753* (2013.01); *H01M 10/052* (2013.01); *H01M 2200/00* (2013.01); *Y02E 60/50* (2013.01)

(56) References Cited

FOREIGN PATENT DOCUMENTS

| JP | 2010-244929 | * 10/2010 | ............ H01M 12/08 |
|----|-------------|-----------|-------------------------|
| JP | A-2010-244929 | 10/2010 | |
| JP | A-2011-096456 | 5/2011 | |
| JP | A-2011-096492 | 5/2011 | |
| JP | A-2011-096586 | 5/2011 | |
| JP | A-2011-108388 | 6/2011 | |
| JP | A-2011-108512 | 6/2011 | |
| WO | WO 2011/129564 | * 10/2011 | ............ H01M 12/06 |

OTHER PUBLICATIONS

International Search Report issued in PCT/JP2012/080149.
Written Opinion of the International Search Authority issued in PCT/JP2012/080149.
Hiroaki Tagawa, "Solid oxide fuel cell and global environment", p. 60, 1998, Agne-shofu Publishing.
International Search Report issued in EP 12851917.0.
(The extended/Supplementary) European Search Report issued in EP 12851917.0.

* cited by examiner

STORAGE CONTAINER FOR THIN LITHIUM-AIR CELL, AND CELL

TECHNICAL FIELD

The present invention relates to a containment vessel of a thin lithium-air battery and a battery including the thin lithium-air battery inside.

Priority is claimed on Japanese Patent Application No. 2011-254162, filed Nov. 21, 2011, and the contents of which is incorporated herein by reference.

BACKGROUND ART

The air battery is a battery including: a solid cathode material (air electrode); an anode material made of metal foil or metal micro-particle; and a liquid or solid electrolyte. The air battery uses: the air or the oxygen gas flowing in the gas passage provided to the inside of the air battery as the cathode active material; and the metal foil or the metal micro-particle as the anode active material.

Many kinds of air battery technologies have been proposed so far. Particularly, research and development of the lithium-air battery are actively conducted recently (see Patent Literatures (PTLs) 1 to 6). Reason for the active research and development of the lithium-air battery is that the energy density per unit weight can be significantly improved compared to the lithium ion battery, which has been put to practical use already, in addition to its usability as a secondary battery capable of being recharged repeatedly.

Among the air battery technologies, the zinc-air battery has been put to practical use (see PTL 7). However, the zinc-air battery is a primary battery incapable of being recharged. Thus, the zinc-air battery is mainly used for the hearing aid since it is light-weighted and low-capacity. In this case, there is no need to make it high-capacity. Therefore, the zinc-air battery is contained in a small-sized metal housing to perform in the practical use.

As an example of air battery, one can mention the fuel cell. In the fuel cell, multiple cells are stacked interspaced by the separator called the bi-polar plate. There are two functions for the bi-polar plate: one is a function to divide two flow passages of the fuel flow for the anode electrode and the air flow for the cathode electrode; and other is a function to directly connect the stacked cells electrically (Non Patent Literature (NPL) 1).

In order to make the stacked battery cell high-capacity, it is necessary for them to be parallel-connected. However, the bi-polar plate is not suitable for that purpose. Moreover, it is very thick and causes a problem of the volume of the battery being too large after stacking the bi-polar plates.

The inventors of the present invention developed a thin cathode structure capable of incorporating the air or oxygen gas, which becomes the cathode active material, into the cathode structure very effectively even if it is stacked with a thin separator and a thin anode structure. Also, they found that a thin lithium-air battery with a large capacity can be produced by using the thin cathode structure with a thin anode structure and a thin separator.

FIG. 1 is an explanatory drawing showing an example of the conventional usage of the thin lithium-air battery. As shown in FIG. 1, the thin lithium battery 101 is used being contained inside of the containment vessel 2201. To the containment vessel 2201, the gas exhaust pipe 2202B and the gas supply pipe 2202A are provided, and parts other than the gas exhaust pipe 2202B and the gas supply pipe 2202A are sealed. The inside of the containment vessel 2201 can be vacuumed by the pump (not shown in FIG. 1) connected to the gas exhaust pipe 2202B. The inside of the containment vessel 2201 can be filled with the air or the oxygen gas by closing the valve 2204 of the gas exhaust pipe 2202B and activating the pump 2203 from the gas supply part (not shown in the drawing) after vacuuming the inside of the containment vessel 2201. When the inside of the containment vessel 2201 is filled with the air or the oxygen gas, the air or the oxygen gas can be supplied to the inside of the thin cathode structure from the opening 99 of the storage case of the thin lithium-air battery 101, allowing the battery reaction to start. Two tabs 97, 98 of the thin lithium-air battery 101 are connected to the blades 2205, 2206 in the containment vessel 2201. The blades 2205, 2206 are connected to the output terminals 2207, 2208. Electricity generated in the thin lithium-air battery 101 can be taken out from the output terminals 2207, 2208.

However, a safely problem still remains. In the conventional containment vessel 2201 shown in FIG. 1, the inside of the vessel is filled with cathode active material and the opening is provided to the thin lithium-air battery 101. Thus, there is non-negligible possibility that the electrolyte or metallic Li, which is the anode material, reacts directly with the oxygen gas or the air.

RELATED ART DOCUMENT

Patent Literature

PTL 1: Japanese Unexamined Patent Application, First Publication No. 2010-192313
PTL 2: Japanese Unexamined Patent Application, First Publication No. 2011-96456
PTL 3: Japanese Unexamined Patent Application, First Publication No. 2011-108388
PTL 4: Japanese Unexamined Patent Application, First Publication No. 2011-108512
PTL 5: Japanese Unexamined Patent Application, First Publication No. 2011-96586
PTL 6: Japanese Unexamined Patent Application, First Publication No. 2011-96492
PTL 7: Published Japanese Translation No. 2008-502118 of the PCT International Publication

Non-Patent Literature

NPL 1: Hiroaki TAGAWA, Solid oxide fuel cell and global environment, p 60, Agne Shofu-Sha

DISCLOSURE OF INVENTION

Problems to be Solved by the Invention

The purpose of the present invention is to provide a containment vessel of a thin lithium-air battery with an improved safely capable of suppressing the rapid exothermic oxidation reaction of its component parts during operation of the thin lithium-air battery.

Aspects of the present invention are configured as explained below.

Means for Solving the Problems

Under the circumstances described above, the inventors of the present invention conducted extensive studies and found the followings. The safely of the thin lithium-air battery can be improved by stopping the progress of the rapid oxidation reaction. It can be achieved by: recognizing the risk by monitoring battery's temperature, pressure, or the like with the sensor while supplying oxygen or air, which is the cathode active material, to the thin lithium-air battery efficiently; and automatically substituting the cathode active material with the inert gas that has been introduced in the containment vessel in advance in a dangerous condition. Also, the inventors developed a connecting member and a connection supporting member capable of supplying air or oxygen gas to the inside of the containment vessel of the thin lithium-air battery filled with the inert gas effectively. The inventor found that by using the connecting member and the connection supporting member, oxygen gas or air can be transported to the inside of the cell more effectively, and the effectiveness of the automatic substitution with the inert gas in the dangerous condition can be improved at the same time. Furthermore, the inventors of the present invention found that: the output voltage and the capacity of the battery can be further improved by connecting multiple thin lithium-air batteries in parallel or series; and the safety of the battery can be improved even more by stably retaining the output voltage and capacity, completing the present invention.

(1) A containment vessel of a thin lithium-air battery including a containment chamber containing the thin lithium-air battery, wherein the containment vessel further includes:

a first gas pipe and a second gas pipe communicated with an inside of the containment chamber;

a third gas pipe and a fourth gas pipe communicated with an inside of the thin lithium-air battery contained in the containment chamber; and a valve that is provided to the third gas pipe and controls opening and closing of communication to the containment chamber, wherein an inert gas supply source is provided to the first gas pipe, and an air or oxygen supply source is provided to the third gas pipe.

(2) The containment vessel of a thin lithium-air battery according to (1) described above, wherein a sensor is provided to the inside of the containment chamber, and the valve is opened when a reading of the sensor exceeds a predetermined threshold value to supply an inert gas to the inside of the thin lithium-air battery.

(3) The containment vessel of a thin lithium-air battery according to (2) described above, wherein the sensor is any one of a gas composition sensor; a pressure sensor; and a temperature sensor, or any combination thereof.

(4) The containment vessel of a thin lithium-air battery according to any one of (1) to (3) described above, wherein an air exhaust mechanism is provided to each of the second gas pipe and the fourth gas pipe.

(5) The containment vessel of a thin lithium-air battery according to any one of (1) to (4) described above, wherein a connecting member connecting: at least any one of the third gas pipe and the fourth gas pipe; and the thin lithium-air battery, is provided.

(6) The containment vessel of a thin lithium-air battery according to (5) described above, wherein the connecting member includes:

a first connecting part that connects to the third gas pipe;

a second connecting part that connects to the fourth gas pipe;

a gas flowing part that connects to the first connecting part and the second connecting part; and a battery connecting part that connects the thin lithium-air battery.

(7) The containment vessel of a thin lithium-air battery according to (5) described above, wherein the connecting member includes:

a third connecting part that engages the third gas pipe or the fourth gas pipe;

a gas flowing part that connects to the third connecting part; and a battery connecting part that connects the thin lithium-air battery.

(8) The containment vessel of a thin lithium-air battery according to (5) or (6) described above, wherein the battery connecting part engages a part containing an opening of a storage case of the thin lithium-air battery.

(9) The containment vessel of a thin lithium-air battery according to (5) or (6) described above, wherein the battery connecting part engages a cathode supporting material of the thin lithium-air battery.

(10) The containment vessel of a thin lithium-air battery according to any one of (5) to (9) described above, wherein a connection supporting member is provided between: the third gas pipe and the fourth gas pipe; and the connecting member.

(11) The containment vessel of a thin lithium-air battery according to (10) described above, wherein the connection supporting member includes: an auxiliary connecting part that connects to the third gas pipe or the fourth gas pipe; and a member connecting part that connects to the connecting member.

(12) The containment vessel of a thin lithium-air battery according to (11) described above, wherein two or more member connecting parts are provided.

(13) A battery including: a containment vessel of a thin lithium-air battery; a containment chamber provided to an inside of the containment vessel of the thin lithium-air battery; and a thin lithium-air battery contained in the containment chamber, wherein the containment vessel of the thin lithium-air battery includes:

a first gas pipe and a second gas pipe communicated with an inside of the containment chamber;

a third gas pipe and a fourth gas pipe communicated with an inside of the thin lithium-air battery contained in the containment chamber; and a valve that is provided to the third gas pipe and controls opening and closing of communication to the containment chamber, an inert gas supply source is provided to the first gas pipe, an air or oxygen supply source is provided to the third gas pipe, the thin lithium-air battery includes a thin cathode structure in which a cathode material made of a porous body is bonded to a cathode supporting material in a plate shape, and a gas flow path, which leads from one side surface of the cathode supporting material or the cathode material to other side surface facing the one side surface, is formed.

(14) The battery according to (13) described above, wherein the gas flow path is a passage, which leads from the one side surface of the cathode supporting material to the other side surface facing the one side surface.

(15) The battery according to (13) described above, wherein the gas flow path is a passage, which leads from the one side surface of the cathode material to the other side surface facing the one side surface.

Effects of the Invention

The containment vessel of a thin lithium-air battery of the present invention is configured as explained below. The containment vessel of a thin lithium-air battery including a containment chamber containing the thin lithium-air battery, wherein the containment vessel further includes: a first gas pipe and a second gas pipe communicated with an inside of the containment chamber; a third gas pipe and a fourth gas pipe communicated with an inside of the thin lithium-air battery contained in the containment chamber; and a valve that is provided to the third gas pipe and controls opening and closing of communication to the containment chamber, wherein an inert gas supply source is provided to the first gas pipe, and an air or oxygen supply source is provided to the third gas pipe. Therefore, the thin lithium-air battery can be contained in the inside of the containment vessel filled with the inert gas when the battery operates. Also, the air or the oxygen, which is the cathode active material, in the inside of the battery can be substituted with the inert gas when the battery malfunctions such as overheating or the like. Also, the safety can be improved by suppressing the explosive reaction with the electrolyte or metallic Li. In addition, the damage can be suppressed even if malfunction such as overheating or the like rapidly occurs causing an explosion of the thin lithium-air battery due to the process substituting air or oxygen in the battery with the inert gas being too late since the thin lithium-air battery has the containment chamber filled with the inert gas.

In the case where the containment vessel of a thin lithium-air battery of the present invention is configured such that a sensor is provided to the inside of the containment chamber, and the valve is opened when a reading of the sensor exceeds a predetermined threshold value to supply an inert gas to the inside of the thin lithium-air battery, the technical effect explained below can be obtained. In the configuration, the thin lithium-air battery is contained in the containment vessel filled with the inert gas and the opening and closing valve provided to the third gas pipe is opened during malfunction. Thus, the cathode active material in the lithium-air battery is substituted with the inert gas and the battery reaction is stopped. Accordingly, ignition of lithium is suppressed and the safety of the battery can be improved.

In the case where the containment vessel of a thin lithium-air battery of the present invention is configured such that a connecting member connecting: the third gas pipe and/or the fourth gas pipe; and the thin lithium-air battery, is provided, the technical effect explained below can be obtained. In the configuration, air or oxygen gas can be supplied stably and efficiently to the thin lithium-air battery contained in the containment vessel filled with the inert gas. Thus, ignition of the electrolyte and lithium can be suppressed. Accordingly, the battery reaction can be reacted in the state with enhance safety.

In the case where the containment vessel of a thin lithium-air battery of the present invention is configured such that a connection supporting member is provided between: the third gas pipe and the fourth gas pipe; and the connecting member, the connection supporting member includes: an auxiliary connecting part that connects to the third gas pipe or the fourth gas pipe; and a member connecting part that connects to the connecting member, and two or more member connecting parts are provided, the technical effect explained below can be obtained. In the configuration, two or more of thin lithium-air batteries can be stably fixed. Accordingly, the battery reaction can be reacted in the state with enhance safety.

BRIEF DESCRIPTION OF THE DRAWINGS

FIG. 14A explains a mounting process of the connecting members 302A, 302B.

FIG. 14B explains a mounting process of the connecting members 302A, 302B.

FIG. 14C explains a mounting process of the connecting members 302A, 302B.

FIG. 19 shows operation sequences to respond to the malfunction output from each sensor in the emergency response system.

BEST MODE FOR CARRYING OUT THE INVENTION

First Embodiment of the Present Invention

Containment Vessel of a Thin Lithium-Air Battery

First, the containment vessel of the thin lithium-air battery, which is an embodiment of the present invention, is explained.

Figure 1:
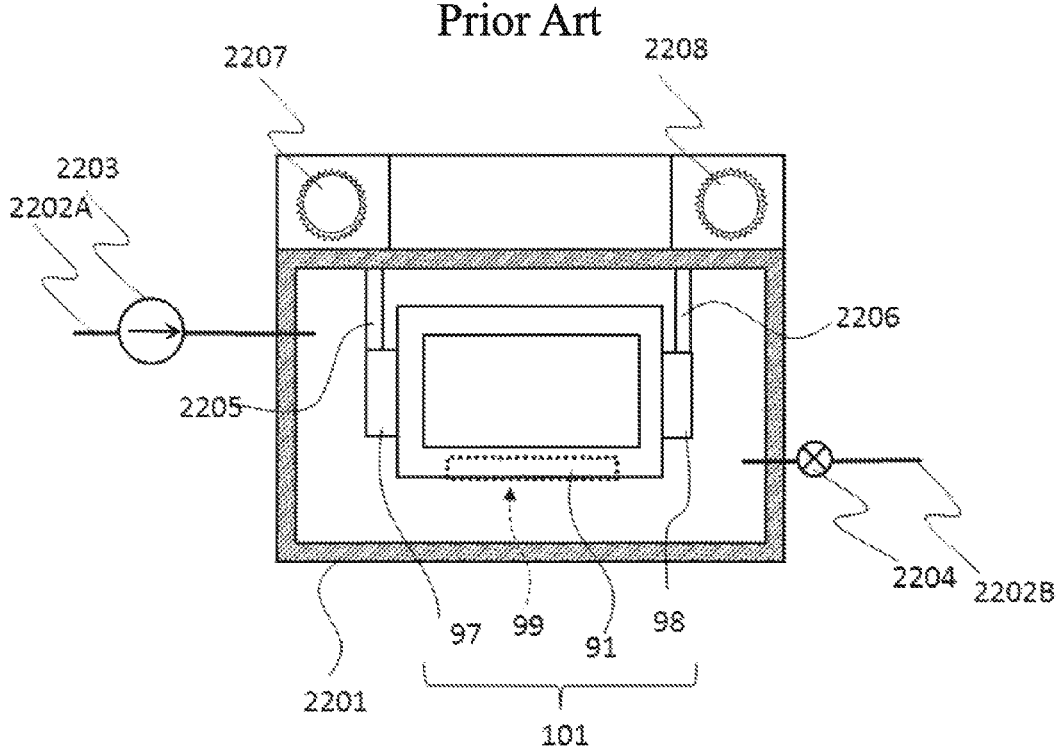
FIG. 1 is a schematic diagram showing an example of a containment vessel of a thin lithium-air battery of the conventional embodiment.
Figure 2:
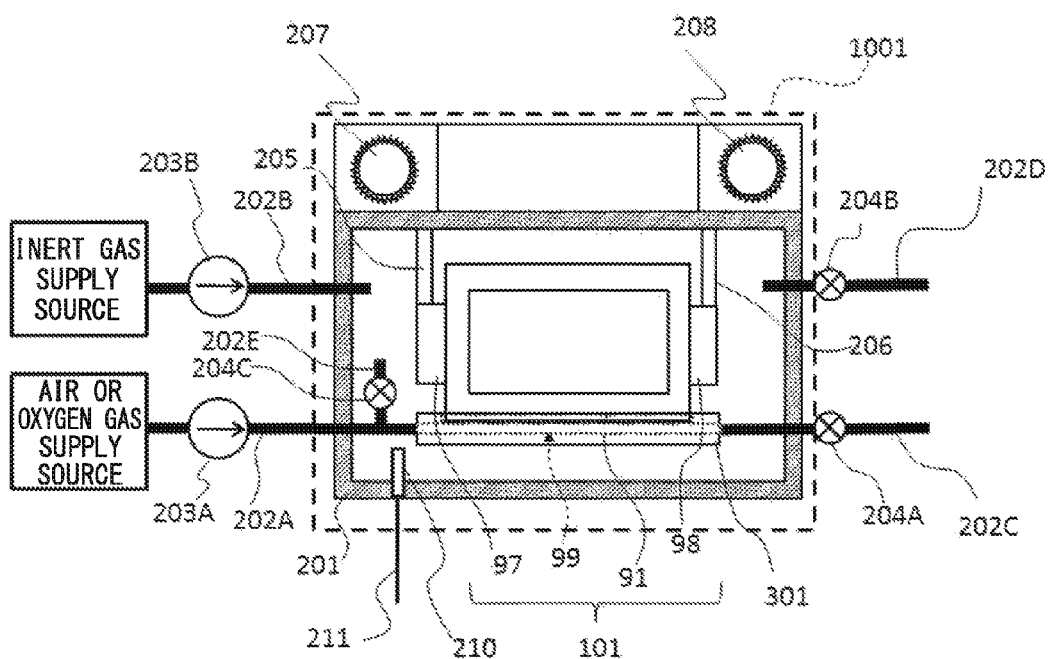
FIG. 2 is a schematic diagram showing an example of a containment vessel of a thin lithium-air battery of the embodiment of the present invention.

FIG. 2 is a schematic diagram showing an example of a containment vessel of a thin lithium-air battery of the embodiment of the present invention.

As shown in FIG. 2, the containment vessel 1001 of the thin lithium-air battery includes the containment chamber 201 capable of containing the thin lithium-air battery 101. Also, the first gas pipe 202B, the second gas pipe 202D, the third gas pipe 202A, and the fourth gas pipe 202C are provided to the containment vessel 1001. In the containment chamber 201, the third gas pipe 202A is branched out to have the fifth gas pipe 202E.

The containment chamber 201 is sealed and kept airtight.

The first gas pipe 202B communicates with the inside of the containment chamber 201. Also, the first gas pipe 202B is attached to the inert gas supply source provided in the outside of the containment chamber 201. By operating the pump 203B, the inert gas can be supplied to the inside of the containment chamber 201.

The second gas pipe 202D communicates with the inside of the containment chamber 201. Also, by operating the valve 204B, the inside of the containment chamber 201 can be exhausted.

The inert gas supply source includes the inert gas tank, the concentrator for supplying the inert gas, or the like. In the case of using a membrane-separation-system nitrogen concentrator as the inert gas supply source, it can be configured for the nitrogen concentrator to serve as an oxygen concentrator as well. The inert gas is nitrogen, a noble gas, or mixture of them.

The third gas pipe 202A communicates with the inside of the thin lithium-air battery 101 in the containment chamber 201. The third gas pipe 202A is attached to the air or oxygen supply source provided in the outside of the containment chamber 201. By operating the pump 203A, air or oxygen gas can be supplied to the inside of the thin lithium-air battery 101.

The fourth gas pipe 202C communicates with the inside of the thin lithium-air battery 101 in the containment chamber 201. By operating the valve 204A, the inside of the thin lithium-air battery 101 can be exhausted.

The fifth gas pipe 202E forms a communication between the third gas pipe 202A and the inside of the containment chamber 201 through the valve 204C. The communication status between the third gas pipe 202A and the inside of the containment chamber 201 can be switched by opening and closing the valve 204C. When the battery is functioning normally, the valve 204C is closed.

The air or oxygen gas supply source may include an oxygen gas tank, a concentrator for supplying oxygen gas, or the like. As the concentrator, a membrane-separation system, which performs concentration by utilizing passing rate difference between nitrogen and oxygen by passing compressed air through a polymer membrane in a form of a hollow fiber, or PSA (Pressure Swing Absorption) system, which allows passage of an adsorbent such as the activated carbon, can be used.

The tabs 97, 98 of the thin lithium-air battery 101 are connected to the blades 205, 206, respectively. The blades 205, 206 are connected to the output terminals 207, 208. The electricity generated by the thin lithium-air battery 101 can be taken out externally from the output terminals 207, 208.

The thin lithium-air battery 101 includes the storage case 91, and the tabs 97, 98. The opening 91 is provided to the storage case 91.

The storage case 91 is sealed and kept airtight. As the storage case 91, a laminate pack may be used.

As shown in FIG. 2, the connecting member 301 connects the thin lithium-air battery 101, the third gas pipe 202A, and the fourth gas pipe 202C.

The sensor 210 is provided in the containment chamber 201. The sensor 210 is connected to the controlling mechanism (omitted in the drawing) by wiring 211. The controlling mechanism is configured to detect malfunction by setting the threshold value. The controlling mechanism is configured to perform the opening and closing control of the valve provided to each of gas pipes in the case of detecting malfunction. As the sensor 201, a pressure sensor, a temperature sensor, a gas composition sensor, or a combination of them can be used. Also, it is preferable to provide multiple sensors to the containment vessel. By providing these sensors, internal malfunction can be detected quickly.

Figure 3:
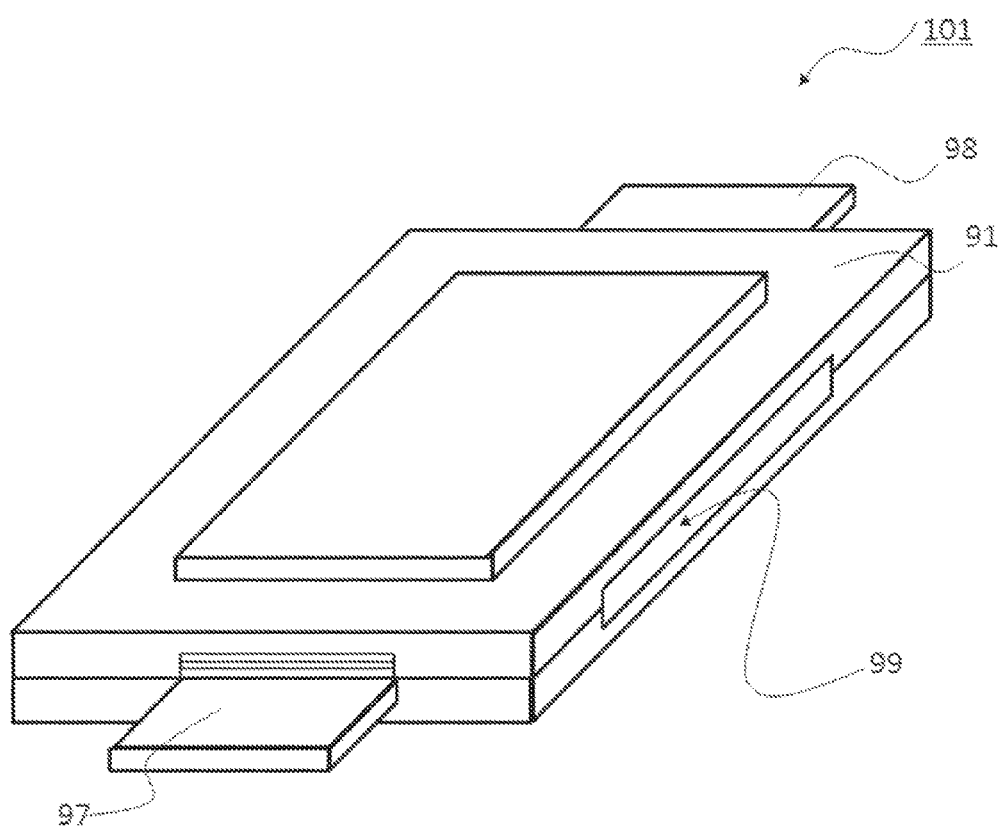
FIG. 3 is a perspective view of the thin lithium-air battery shown in FIG. 2.

FIG. 3 is a perspective view of the thin lithium-air battery shown in FIG. 2.

As shown in FIG. 3, the thin lithium-air battery 101 is contained in the storage case 91. From one end and other end of the thin lithium-air battery 101, the tabs 97, 98 protrude, respectively. In the one side of the thin lithium-air battery 101, the opening 99 is provided.

Figure 4A:
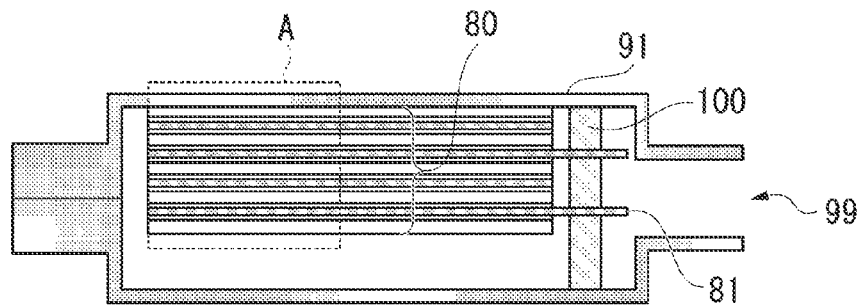
FIG. 4A is a cross sectional view of the thin lithium-air battery shown in FIG. 2.
Figure 4B:
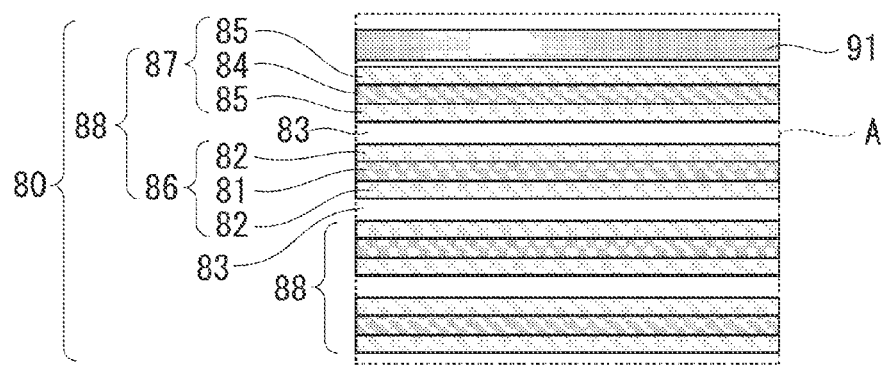
FIG. 4B is an enlarged view of the part indicated as "A" in FIG. 4A.

FIGS. 4A and 4B are a drawing of the thin lithium-air battery shown in FIG. 3. FIG. 4A is a cross sectional view, and FIG. 4B is an enlarged view of the part indicated as "A" in FIG. 4A.

As shown in FIG. 4A, the cathode supporting material 81 is exposed through the opening 99. Also, dividing wall film 100 is provided for the stacked body 80 not to be exposed through the opening 99.

The dividing wall film 100 is made of an organic or inorganic material. The dividing wall film 100 functions as a dividing wall between the internal space of the battery where the electrolyte presents and the vicinity of the opening where the air (oxygen) is flown in. By providing the dividing wall film 100, leakage and the cathode active material getting close to the vicinity of the anode electrode can be prevented.

As shown in FIG. 4B, the stacked body 80 is formed by stacking the 3 unit structures 88 sandwiched by two thin separators 83 interspaced by another thin separator 83.

The unit structure 88 is formed by stacking the thin cathode structure 86, the thin separator 83, and the thin anode structure 87. The anode materials 85 are formed in the both sides of the anode supporting material 84 in the thin anode structure 87. The cathode materials 82 are formed in the both sides of the cathode supporting material 81 in the thin cathode structure 86.

Figure 5:
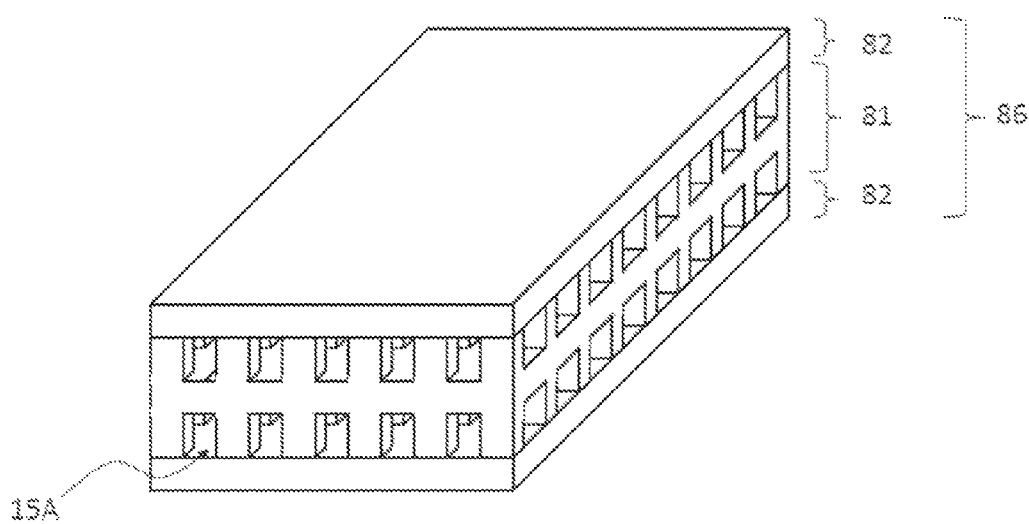
FIG. 5 is a perspective view showing an example of a thin cathode structure.

FIG. 5 is a perspective view showing an example of a thin cathode structure.

As shown in FIG. 5, in the thin cathode structure 86, the cathode material 82 whose major composition is carbon is formed on the both sides of the cathode supporting material 81, which functions as a collector.

The cathode supporting material 81 is in a substantially plate shape and trenches are formed on both sides. By placing the cathode material 82 on the top of these trenches, they become the holes 15A. The holes 15A are communicated to all of the side surfaces of the cathode supporting material 11.

Figure 20:
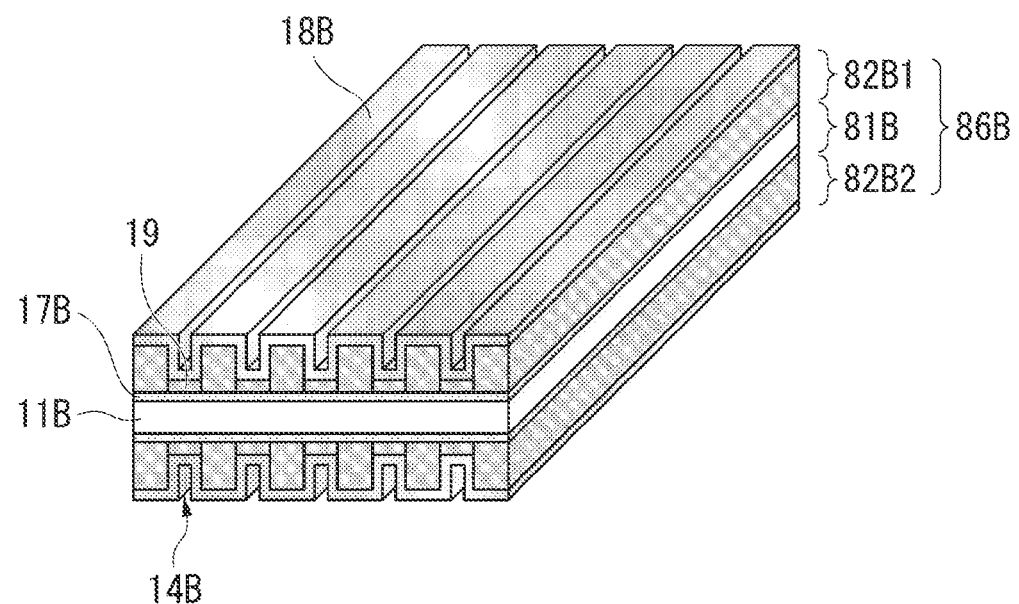
FIG. 20 is a perspective view showing a modified example of the thin cathode structure.

FIG. 20 is a perspective view showing a modified example of the thin cathode structure.

As shown in FIG. 20, the thin cathode structure 86B of an embodiment of the present invention is substantially configured in a way that square pillar shaper cathode materials 82B1, 82B2 are placed in a parallel arrangement on the both sides of the cathode supporting material 81B in a substantially rectangular shape in a plane view. In the configuration, the layer made of an oil-repellent molecule is formed to cover the cathode supporting material 81B and the cathode materials 82B1, 82B2.

As shown in FIG. 20, the trenches 14B, each of which has a width of n and is in a line shape in a plan view, for a gas flowing passage are formed with a constant interspace in parallel direction between the neighboring cathode materials 82B1, 82B2.

As shown in the above-described example and modified example of the thin cathode structures, a gas flowing passage is formed in the thin cathode structure of the present embodiment. The gas flow passage leads from the one side surface of the cathode supporting material or the cathode material to the other side surface facing the one side surface.

With the gas flowing passage, oxygen is supplied efficiently from the third gas pipe to the cathode material. Also, in the case of substituting the gas in the lithium-air battery with the inert gas during malfunction, with the gas flowing passage, the inert gas spreads the entire region of the cathode material efficiently. By having this configuration, the safely of the battery having the thin cathode structure of the present embodiment can be further improved.

[Connecting Member]

Figure 6A:
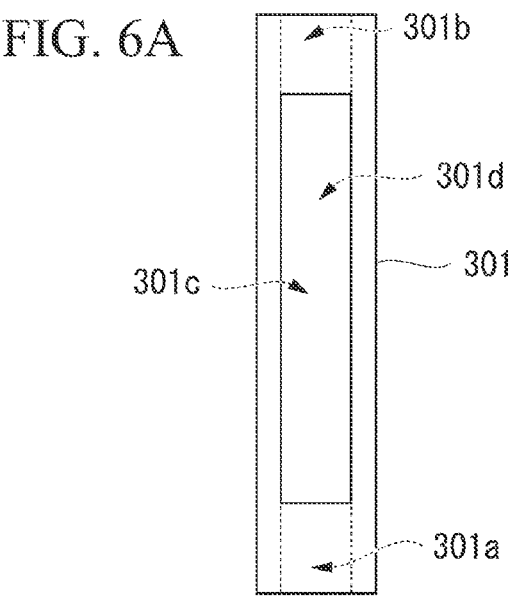
FIG. 6A is a left side view of the connecting member shown in FIG. 2.
Figure 6B:
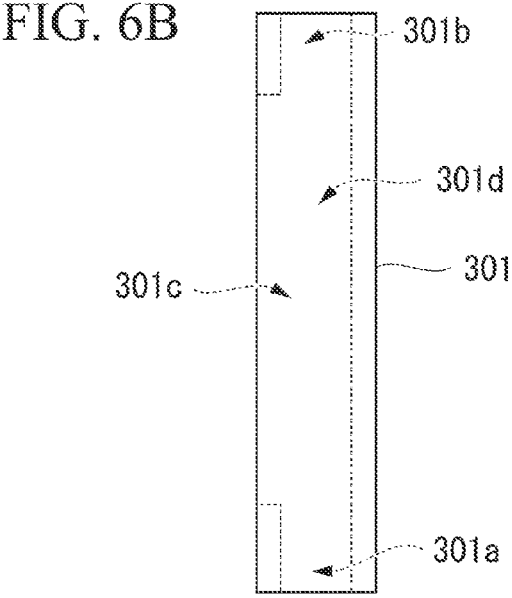
FIG. 6B is a plan view of the connecting member shown in FIG. 2.
Figure 6C:
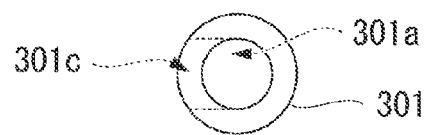
FIG. 6C is a front view of the connecting member shown in FIG. 2.

FIGS. 6A, 6B, and 6C are drawings of the connecting member shown in FIG. 2. FIG. 6A is a left side view. FIG. 6B is a plan view. FIG. 6C is a front view.

As shown in FIGS. 6A to 6C, the connecting member 301 is in a substantially cylindrical shape. The battery connecting part 301c, which is opened in a substantially oblong shape in a plan view, is provided in its side surface. At one end part of the cylinder, the first connecting part 301a opened in a circular shape in a plan view is provided. At the other end part of the cylinder, the second connecting part 301b opened in a circular shape in a plan view is provided.

The gas flowing part 301d is provided in such a way that the first connecting part 301a, the second connecting part 301b, and the battery connecting part 301c are communicated.

Figure 7:
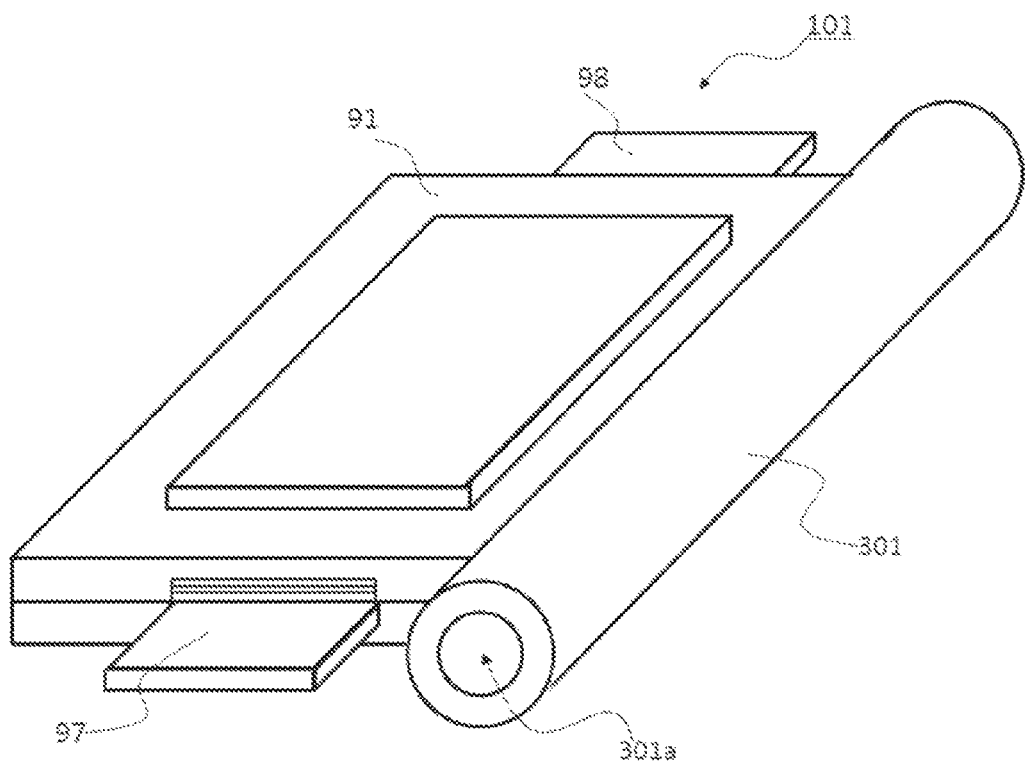
FIG. 7 is a perspective view of the thin lithium-air battery in the state where the connecting member is provided.

FIG. 7 is a perspective view of the thin lithium-air battery in the state where the connecting member is provided.

As shown in FIG. 7, the connecting member 301 in a substantially cylindrical shape is provided to one side surface of the thin lithium-air battery 101.

Figure 8:
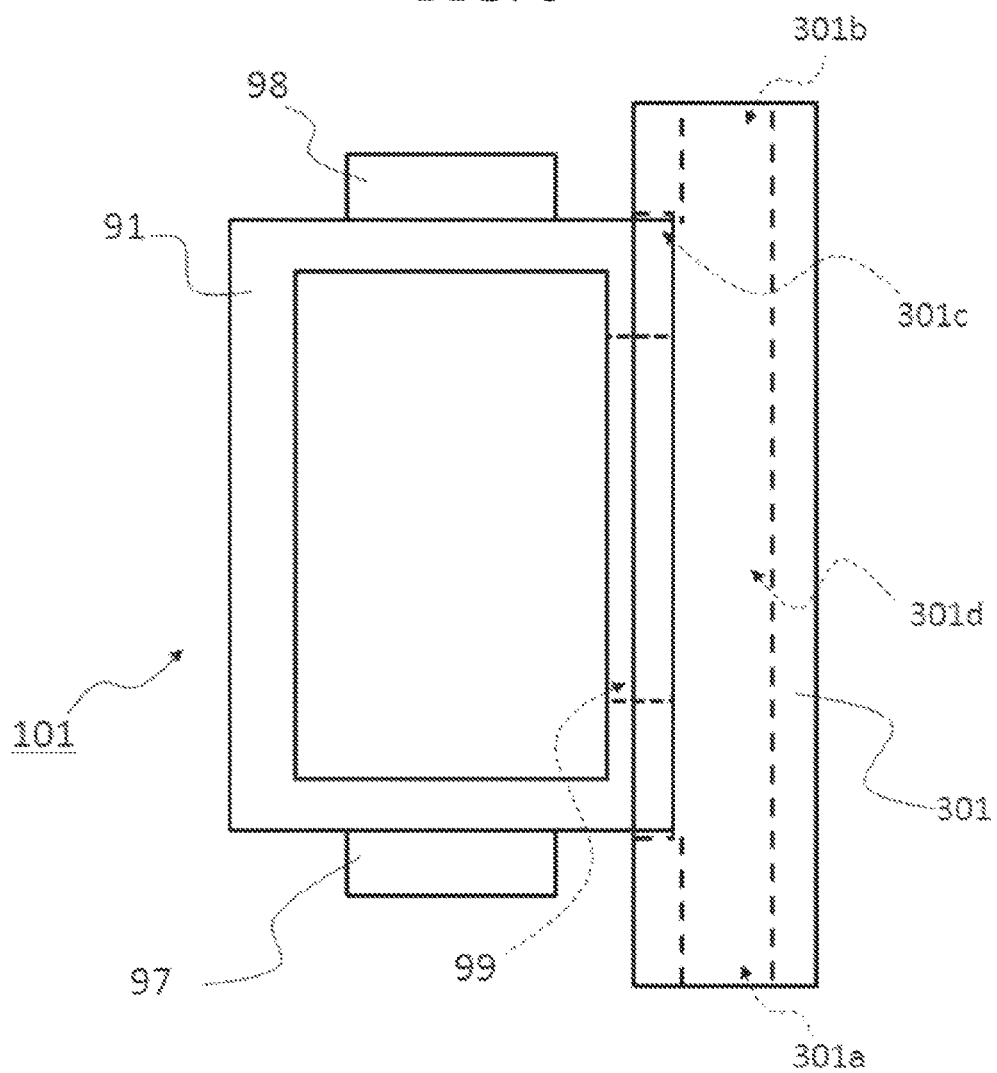
FIG. 8 is a plan view of the thin lithium-air battery shown in FIG. 7 in the state where the connecting member is provided.

FIG. 8 is a plan view of the thin lithium-air battery shown in FIG. 7 in the state where the connecting member is provided.

As shown in FIG. 8, the battery connecting part 301c of the connecting member 301 is inserted by and engages one side surface of the thin lithium-air battery 101. There is the opening 99 provided in the one side surface.

As shown in FIGS. 8 and 2, the opening of the first connecting part 301a is inserted by and engages the third gas pipe 202A. Also, the opening of the second connecting part 301b is inserted by and engages the fourth gas pipe 202C.

By having the configurations describe above, the air or oxygen gas flows in the gas flowing passage 301d from the third gas pipe 202A through the first connecting part 301a. Then, the air or oxygen gas is supplied to the inside of the thin lithium-air battery 101 from the battery connecting part 301c through the opening 99. At this time, the valve 204C is closed and the noble gas is not introduced from the fifth gas pipe 202E.

The air or oxygen gas flows in the holes 15A of the thin cathode structure 86 and is incorporated into the cathode material 82 to perform the battery reaction with lithium ions in the electrolyte in the micro-pores of the cathode material 82.

The air or oxygen gas not participating to the reaction flows in the gas flowing passage 301d from the opening 99 through the battery connecting part 301c. Then, the air or oxygen gas is exhausted from the fourth gas pipe 202C through the second connecting part 301b.

[Safety Mechanism of the Containment Vessel of the Thin Lithium-Air Battery]

Next, the safety mechanism of the containment vessel of the thin lithium-air battery of an embodiment of the present invention is explained.

In the containment vessel of the thin lithium-air battery of the embodiment of the present invention, first, the inert gas is supplied to the inside of the containment vessel 1001 of the thin lithium-air battery (inert gas supplying process). Then, the battery reaction is reacted by supplying the air or oxygen gas to the thin lithium-air battery (air or oxygen gas supplying process). By filling the surrounding of the thin lithium-air battery with the inert gas to suppress an explosion, the safety can be ensured. Followings are more detailed explanations of the above-mentioned processes.

[Inert Gas Supplying Process]

First, in the containment vessel 1001 of the thin lithium-air battery shown in FIG. 2, the valve 204B is opened. Then, a vacuum pump (omitted in the drawing) connected to the gas pipe 202D is operated to exhaust the inside of the containment chamber 201.

Next, after closing the valve 204B, the inert gas is supplied from the first gas pipe 202B to the inside of the containment chamber 201 by operating the pump 203B.

In the inert gas supplying process, it is preferable to adjust the pressure of the inert gas in the containment chamber 201 by adjusting the amount of exhaustion from the second gas pipe 202D while adjusting the openness of the valve 204B.

[Air or Oxygen Gas Supplying Process]

Next, the valve 204A is opened and the valve 204C is closed. Then, the vacuum pump (omitted in the drawing) connected to the gas pipe 202C is operated to exhaust the inside of the thin lithium-air battery 101.

Next, after closing the valve 204A, the pump 203A is operated to supply air or oxygen gas to the inside of the thin lithium-air battery 101 from the third gas pipe 202A.

In the air or oxygen gas supplying process, it is preferable to adjust the pressure of the air or oxygen gas in the thin lithium-air battery 101 by adjusting the amount of exhaustion from the fourth gas pipe 202C while adjusting the openness of the valve 204A.

By performing the above-described processes, a sufficient amount of air or oxygen gas can be supplied to the inside of the thin lithium-air battery 101 to react the battery reaction.

[Purge Process by the Inert Gas]

Also, the containment vessel has a safety mechanism to purge the inside of the thin lithium-air battery 101 with the inert gas during malfunctioning.

Being malfunctioned is defined by a state where the reading in a sensor in the containment chamber exceeds a predetermined threshold value which is set in advance. When such a state occurs, the valve 204C of the fifth gas pipe 202E is opened to supply the inert gas to the inside of the thin lithium-air battery. By performing this operation, an explosion can be suppressed, and the safety can be ensured.

Specifically, in the case of occurrence of malfunction such as overheating or the like and emergency shutdown of the electrical discharge being necessary, by opening the valve 204A and valve 202C, the air or oxygen gas filled in the inside of the thin lithium-air battery 101 is purged by substituting them with the noble gas filled in the containment chamber 201. By performing this operation, the battery discharging operation can be stopped.

Even if the emergency shutdown operation to the exceeding exothermal reaction rate was too late, infiltration of water to the inside of the thin lithium-air battery 101 is fully prevented since the thin lithium-air battery 101 is contained in the containment chamber 201 filled with the inert gas. Thus, ignition of the lithium is suppressed and the battery reaction can be reacted at an improved safety level compared to the conventional battery.

Also, since the thin lithium-air battery 101 is covered with the containment vessel 1001 of the thin lithium-air battery, spreading of damage can be prevented even if an explosion or the like occurred in the thin lithium-air battery.

Second Embodiment of the Present Invention

Containment Vessel of the Thin Lithium-Air Battery

Figure 9:
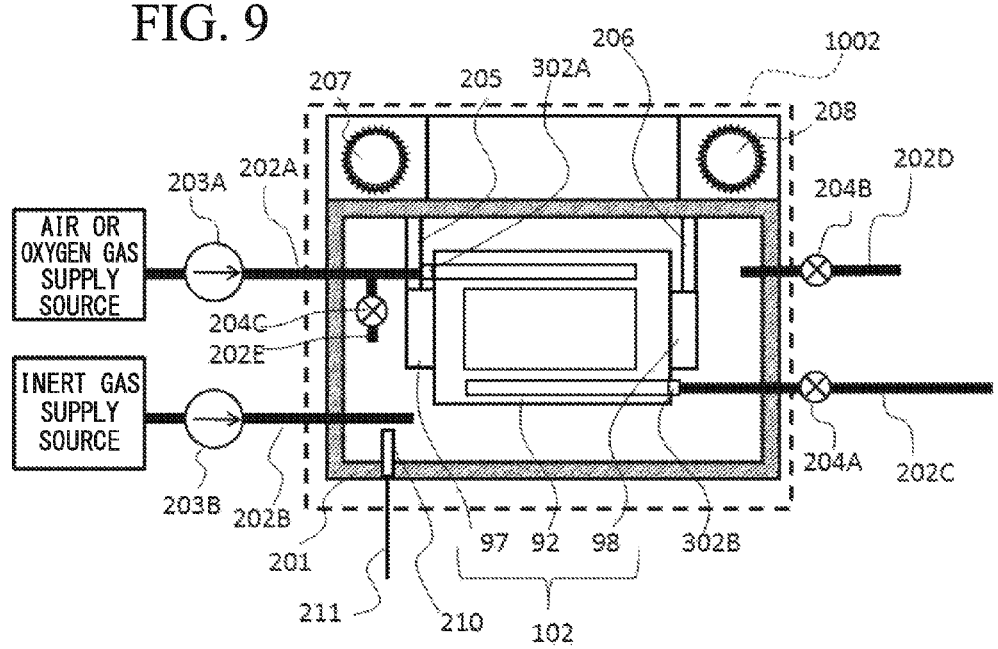
FIG. 9 is a schematic diagram showing another example of a containment vessel of a thin lithium-air battery of the embodiment of the present invention.

FIG. 9 is a schematic diagram showing another example of a containment vessel of a thin lithium-air battery of the embodiment of the present invention.

As shown in FIG. 9, the thin lithium-air battery 102 provided with the connecting members 302A, 302B is contained in the containment vessel 1002 of the thin lithium-air battery of the embodiment of the present invention. Except for the difference of the arrangement of the gas pipe, the present embodiment is configured in the substantially the same way as in the first embodiment.

Figure 10:
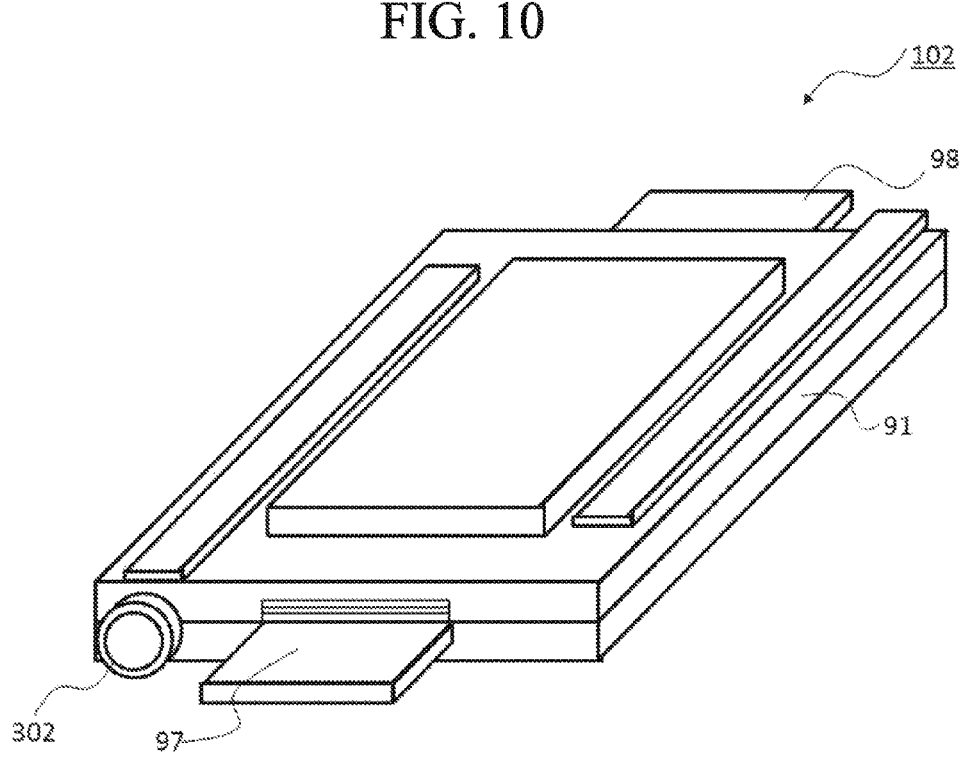
FIG. 10 is a perspective view of the thin lithium-air battery 102.
Figure 11:
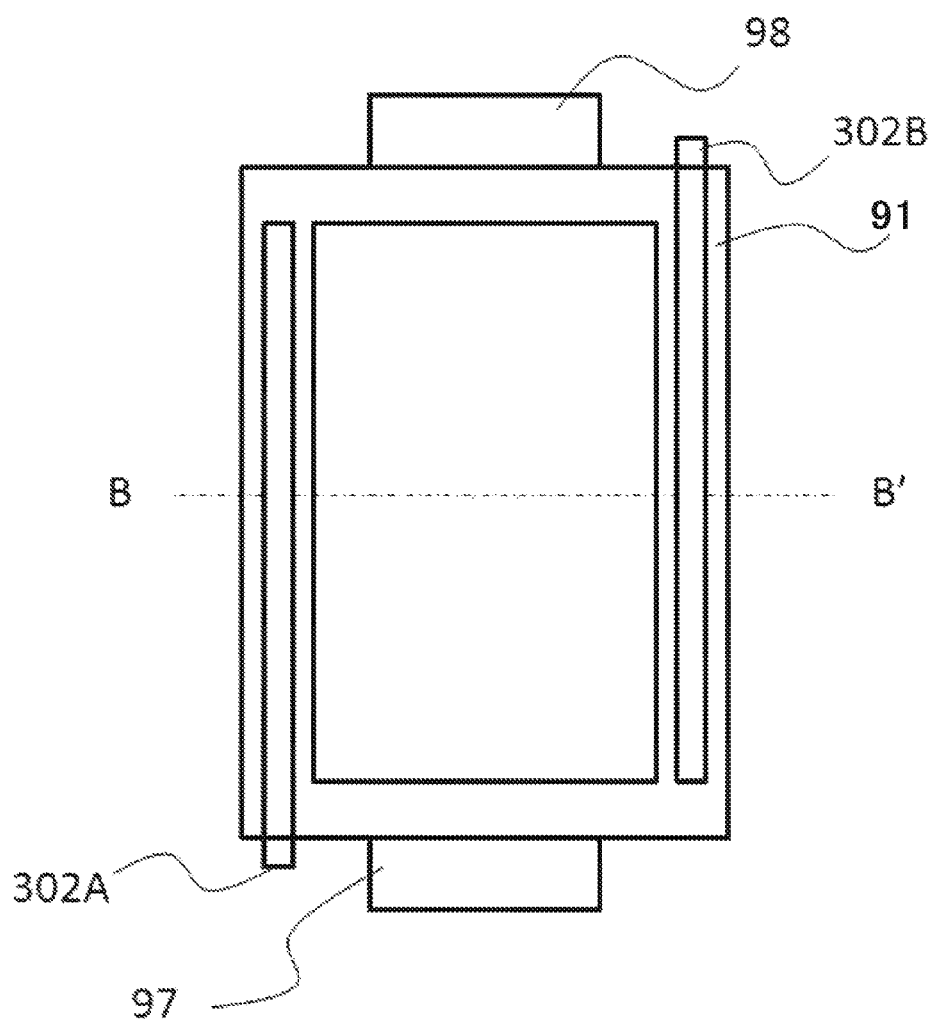
FIG. 11 is a plan view of the thin lithium-air battery 102 shown in FIG. 10.

FIG. 10 is a perspective view of the thin lithium-air battery 102. FIG. 11 is a plan view of the thin lithium-air battery 102 shown in FIG. 10.

As shown in FIGS. 10 and 11, the thin lithium-air battery 102 is contained in the storage case 91, and the tabs 97, 98 protrude from one end and other end of the thin lithium-air battery 102.

The connecting members 302A, 302B are placed in such a way that the major parts of them are place inside of the storage case 91 and end portions of them protrude on the opposite directions from the storage case 91.

Figure 12A:
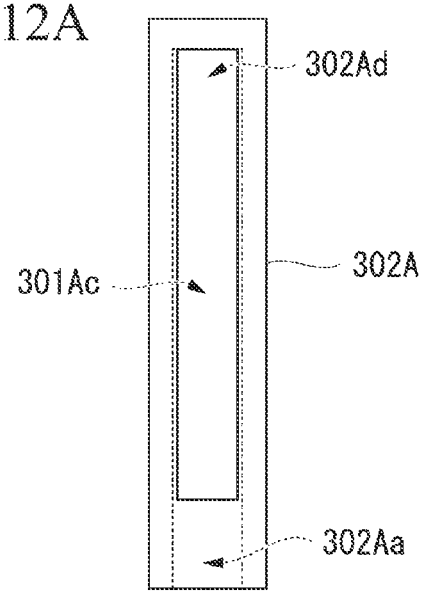
FIG. 12A is a left side view showing an example of the connecting member shown in FIGS. 9 to 11.
Figure 12B:
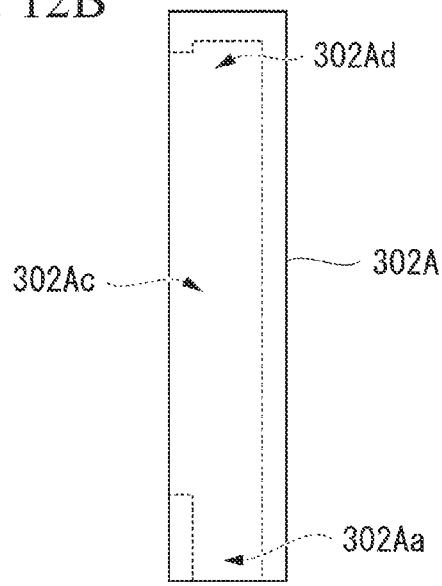
FIG. 12B is a plan view showing an example of the connecting member shown in FIGS. 9 to 11.
Figure 12C:
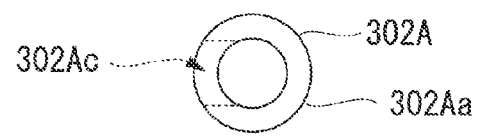
FIG. 12C is a front view showing an example of the connecting member shown in FIGS. 9 to 11.

FIGS. 12A, 12B, and 12C are drawings showing the example of the connecting member shown in FIGS. 9 to 11. FIG. 12A is a left side view. FIG. 12B is a plan view. FIG. 12C is a front view.

As shown in FIGS. 12A, 12B, and 12C, the connecting member 302A is in a substantially cylindrical shape. The battery connecting part 302Ac, which is opened in a substantially oblong shape in a plan view, is provided in its side surface. At one end part of the cylinder, the third connecting part 302Aa opened in a circular shape in a plan view is provided. Other end is closed. The gas flowing part 302Ad is provided to form the communication between the third connecting part 302Aa and the battery connecting part 302Ac.

The connecting member 302B is configured in the same manner as the connecting member 302A. That is, a battery connecting part, which is opened in a substantially oblong shape in a plan view, is provided in its side surface. At one end part of the cylinder, the third connecting part opened in a circular shape in a plan view is provided. Other end is closed. The gas flowing part is provided to form the communication between the third connecting part and the battery connecting part.

Figure 13:
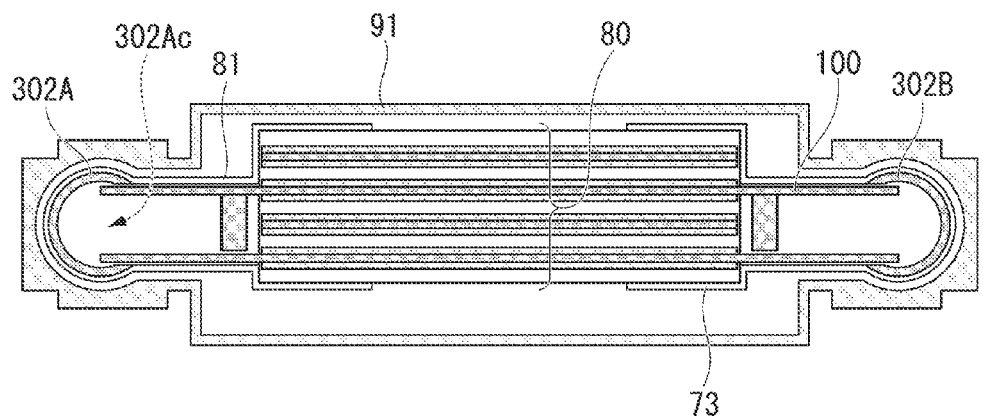
FIG. 13 is a cross sectional view on "B-B' line" in FIG. 11.

FIG. 13 is a cross sectional view on "B-B' line" in FIG. 11.

As shown in FIG. 13, the stacking body 80 is formed for the cathode supporting material 81 alone to be protruded in both sides. Also, the connecting members 302A, 302B are attached to and engage the stacking body 80 in the protruded parts of the cathode supporting material 81. Also, the dividing wall film 100 is placed to block the interspace of the cathode supporting material 81. Furthermore, the sealing film 73 covers the connecting members 302A, 302B, and a part of the stacked body 80.

For the sealing film 73, the film with barrier properties to the air or oxygen, which is the cathode active material, is used. A film made of the same material as the dividing wall film 100 may be used. It is preferable that at least the surface of the dividing wall film 100 is made of a material with a high electrical insulation property. In FIGS. 12A, 12B, and 12C, the dividing wall film 100 covers only the part of the stacked body 80. However, the dividing wall film 100 may cover all of the stacked body 80 in the case of using the dividing wall film 100 made of a material with a high electrical insulation property. By having the above-described configuration, leakage of the air or oxygen gas can be reduced, and the reaction efficiency of the battery can be improved.

Figure 14A:
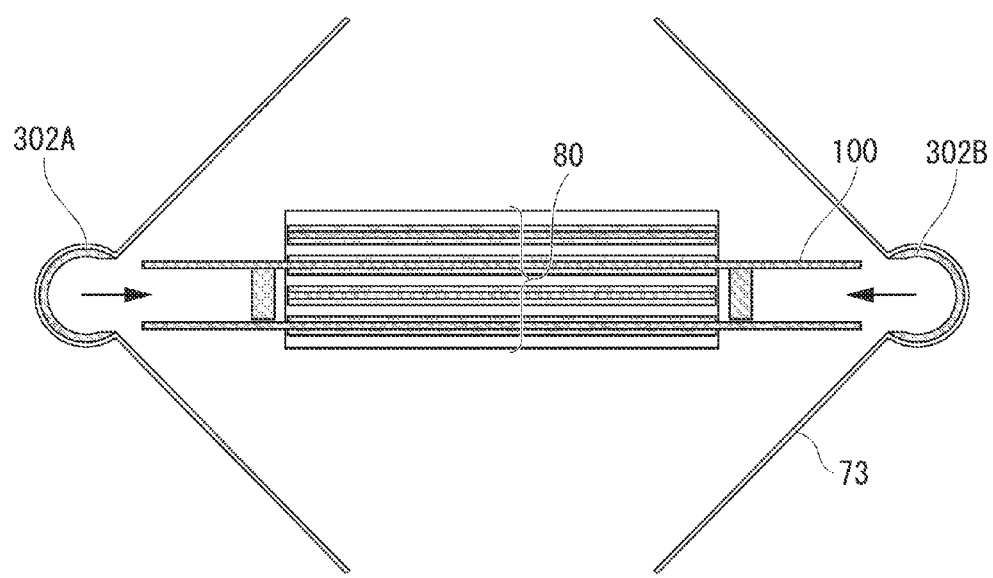
FIG. 14A is a diagram explaining the production process of the thin lithium-air battery.
Figure 14B:
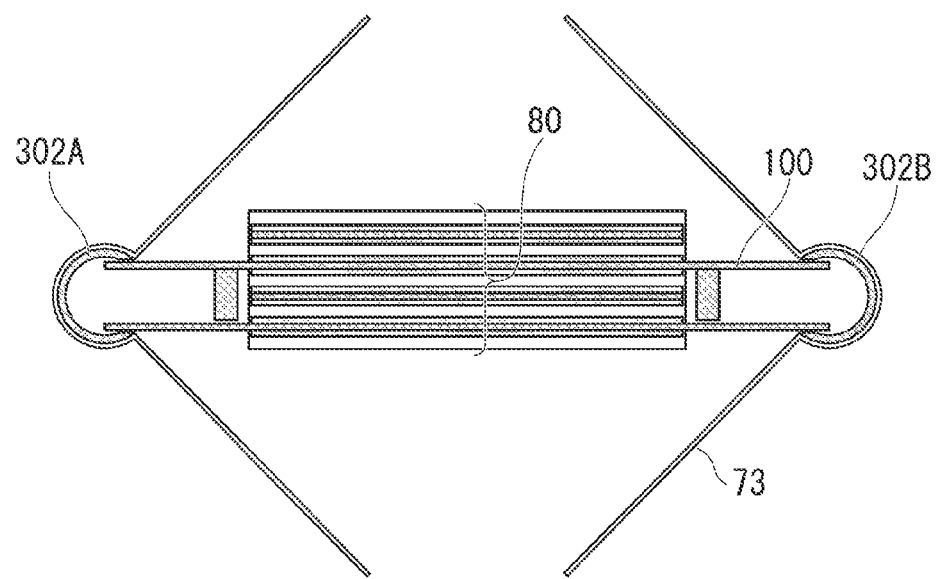
FIG. 14B is a diagram explaining the production process of the thin lithium-air battery.
Figure 14C:
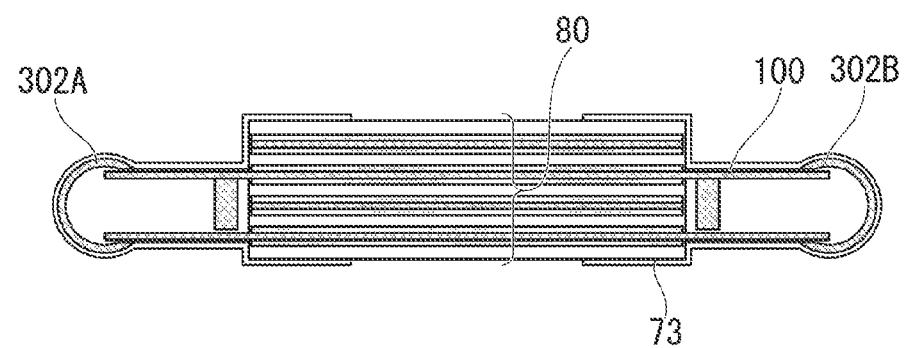
FIG. 14C is a diagram explaining the production process of the thin lithium-air battery.

FIGS. 14A, 14B, and 14C are diagrams explaining the production process of the thin lithium-air battery. FIGS. 14A, 14B, and 14C explain a mounting process of the connecting members 302A, 302B.

First, the stacking body 80 is prepared. The interspace of the protruded portions of the cathode supporting material 81 is blocked by the dividing wall film 100.

Next, as shown in FIGS. 14A and 14B, the protruded portions of the cathode supporting material 81 are attached to the connecting members 302A, 302B in such a way that the protruded portions engage the battery connecting part 302Ac or the like.

Next, as shown in FIG. 14C, the sealing film 73 is pasted so as to trace the stacked body 80 and the connecting members 302A, 302B.

Next, the stacked body and the connecting members 302A, 302B pasted with the sealing film 73 is place in the storage case 91 to produce the thin lithium-air battery.

It is preferable for the sealing film 73 to have been pasted on the outer surfaces of the connecting members 302A, 302B in advance. By following the procedure, misalignment during the assembling process can be suppressed, and work efficiency can be enhanced.

As shown in FIG. 9, the opening of the third connecting part 302Aa of the connecting member 302A is inserted by and engages the third gas pipe 202A. Also, the opening of the third connecting part of the connecting member 302B is inserted by and engages the fourth gas pipe 202C.

By having the configurations described above, the air or oxygen gas flows in the gas flowing part 302Ad from the third gas pipe 202A through the third connecting part 302Aa. Then, the air or oxygen gas is supplied to the inside of the thin lithium-air battery 102 from the battery connecting part 302Ac through the cathode supporting material 81.

The air or oxygen gas flows in the holes 15A of the thin cathode structure and is incorporated into the cathode material 82 to perform the battery reaction with lithium ions in the electrolyte in the micro-pores of the cathode material 82.

The air or oxygen gas not participating to the reaction flows in the gas flowing passage 302Ad from the cathode supporting material 81 through the battery connecting part 302Ac. Then, the air or oxygen gas is exhausted from the fourth gas pipe 202C through the third connecting part of the connecting member 302B.

In the case of operational malfunctioning, as in the first embodiment, by opening the valve 204A and valve 204C, the air or oxygen gas filled in the inside of the thin lithium-air battery 102 is purged by substituting them with the noble gas filled in the containment chamber 201. By performing this operation, the battery discharging operation can be stopped.

By having the configurations of the present embodiment, transportation efficiency of the air or oxygen gas in the thin lithium-air battery 102 can be improved. At the same time, gas displacement efficiency during operational malfunctioning can be improved. As a result, a safer operation can be obtained.

Third Embodiment of the Present Invention

Figure 15:
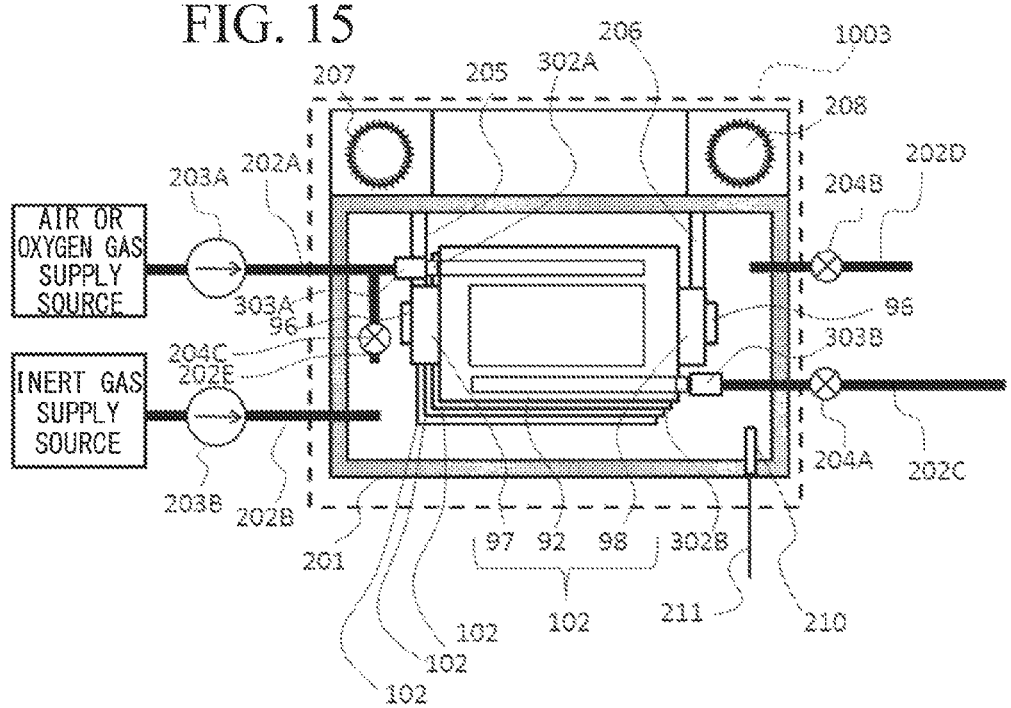
FIG. 15 is a schematic diagram showing yet another example of a containment vessel of a thin lithium-air battery of the embodiment of the present invention.

FIG. 15 is a schematic diagram showing yet another example of a containment vessel of a thin lithium-air battery of the embodiment of the present invention.

As shown in FIG. 15, 4 sheets of the thin lithium-air batteries 102 are contained and they are connected each other by the connection supporting members 303A, 303B in the containment vessel 1003 of a thin lithium-air battery of the embodiment of the present invention. Other than that, the third embodiment is configured in the substantially same manner as the second embodiment.

Figure 16A:
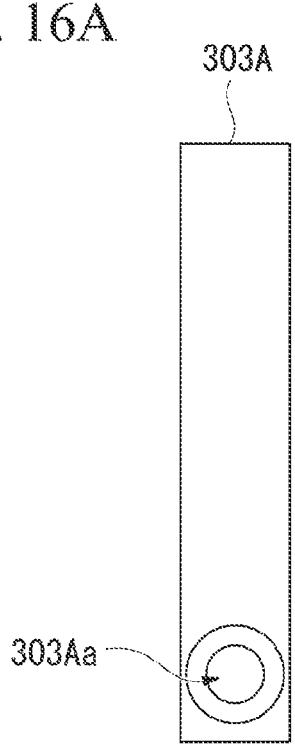
FIG. 16A is a left side view showing an example of the connection supporting member.
Figure 16B:
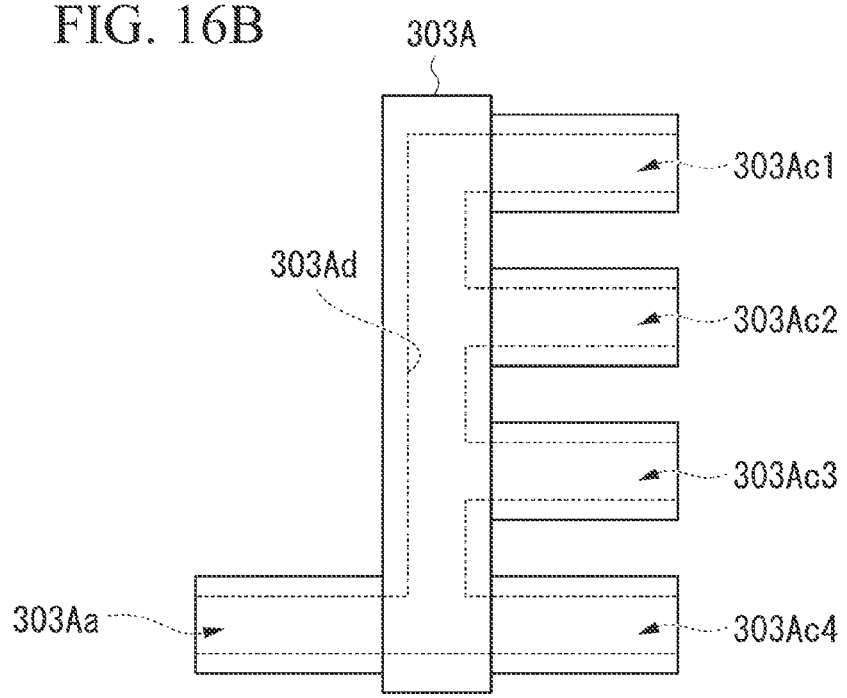
FIG. 16B is a plane view showing an example of the connection supporting member.
Figure 16C:
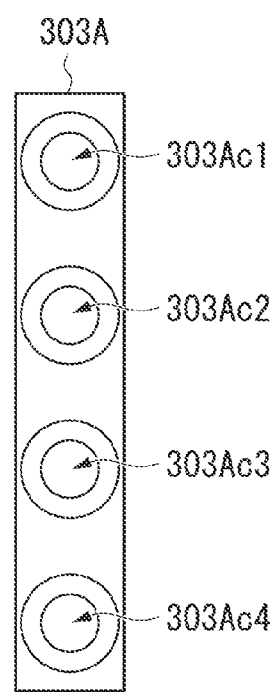
FIG. 16C is a front view showing an example of the connection supporting member.

FIGS. 16A, 16B, and 16C are drawings showing an example of the connection supporting member. FIG. 16A is a left side view. FIG. 16B is a plane view. FIG. 16C is a front view.

As shown in FIGS. 16A to 16C, the connection member 303A has the structure in which 6 cylindrical members are connected.

As shown in FIG. 16A, the auxiliary connecting part 303Aa opened in a circular shape in a plan view is provided to the connection member 303A.

As shown in FIG. 16B, the auxiliary connecting part 303Aa is provided to an end portion of one of the cylindrical members and its base portion is connected to other cylindrical member. To the other cylindrical member, 4 cylindrical members are connected. To the end portions of the four cylindrical members, the member connecting parts 303Ac1, 303Ac2, 303Ac3, 303Ac4, which are opened in a circular shape in a plan view, are provided.

In the other cylindrical member, the gas flowing part 303Ad is provided. The gas flowing part 303Ad is communicated with each of the auxiliary connecting part 303Aa, and the member connecting parts, 303Ac1, 303Ac2, 303Ac3, 303Ac4.

Figure 17:
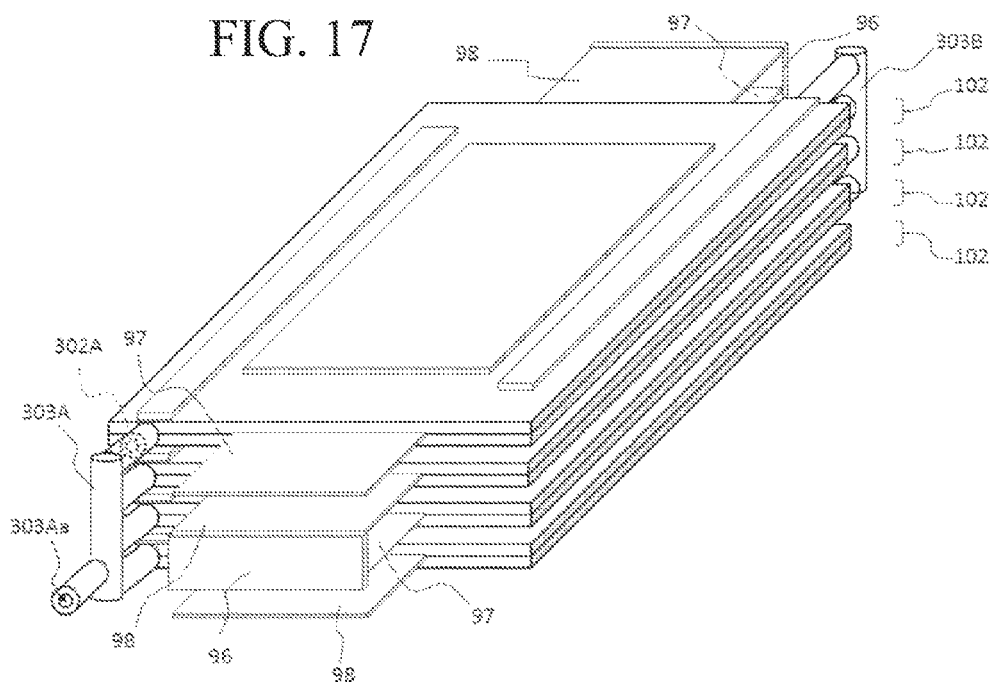
FIG. 17 is a perspective view of four plates of thin lithium-air batteries 102 connected by the connection supporting member.

FIG. 17 is a perspective view of four plates of thin lithium-air batteries 102 connected by the connection supporting member. The tabs 97, 98 are connected to the tab connection supporting material 96 in such a way that the 4 sheets of the thin lithium-air batteries 102 are in the tandem arrangement. Also, the 4 sheets of the thin lithium-air batteries 102 are connected by the connection supporting members 303A, 303B.

The connection supporting member 303A engages the connecting member 302A of the 4 sheets of the thin lithium-air batteries 102 in the member connecting parts 303Ac1, 303Ac2, 303Ac3, 303Ac4.

Similarly, the connection supporting member 303B engages the 4 sheets of the thin lithium-air batteries 102. The 4 sheets of the thin lithium-air batteries 102 are stably held by the connection supporting members 303A, 303B.

The connection supporting member 303A engages the third gas pipe 202A in the auxiliary connecting part 303Aa. Similarly, the connection supporting member 303B engages the fourth gas pipe 202C in the auxiliary connecting part.

By having the configurations described above, the air or oxygen gas is supplied to the inside of the thin lithium-air battery 102 from the third gas pipe 202A through the connection supporting member 303A, the connecting member 302A, and the cathode supporting material 81.

The air or oxygen gas flows in the holes 15A of the thin cathode structure and is incorporated into the cathode material 82 to perform the battery reaction with lithium ions in the electrolyte in the micro-pores of the cathode material 82.

The air or oxygen gas not participating to the reaction is exhausted from the fourth gas pipe 202C through the cathode supporting material 81, the connecting member 302B, and the connection supporting member 303B.

In the case of operational malfunctioning, as in the first embodiment, by opening the valve 204A and valve 204C, the air or oxygen gas filled in the inside of the thin lithium-air battery 102 is purged by substituting them with the noble gas filled in the containment chamber 201. By performing this operation, the battery discharging operation can be stopped.

By having the configurations of the present embodiment, transportation efficiency of the air or oxygen gas in the thin lithium-air battery 102 can be improved. At the same time, gas displacement efficiency during operational malfunctioning can be improved. As a result, a safer operation and a higher electric voltage can be obtained.

The containment vessels 1001, 1002, 1003 of thin lithium-air batteries of the embodiments of the present invention are containment vessels of thin lithium-air batteries including the containment chamber 201 containing the thin lithium-air batteries 101, 102. They include: the first gas pipe 202B and the second gas pipe 202D communicated with the inside of the containment chamber 201; the third gas pipe 202A and the fourth gas pipe 202C communicated with the insides of the thin lithium-air batteries 101, 102 contained in the containment chamber 201; and the valve 204C that controls opening and closing of the communication of the third gas pipe 202A to the inside of the containment chamber 201. The inert gas supply source is attached to the first gas pipe. The air or oxygen gas supply source is attached to the third gas pipe. By having the above-explained configuration: the inside of the containment vessel is filled with the inert gas efficiently; the air or oxygen gas is supplied stably and efficiently to the inside of the thin lithium-air battery; and the thin lithium-air battery can be contained in the containment vessel filled with the inert gas. Since they have the function substituting the air or oxygen gas in the thin lithium-air battery with the inert gas during malfunctioning such as overheating, ignition of lithium can be suppressed and the safety can be enhanced. Also, since they have the containment chamber, spreading of damage can be prevented even if an explosion or the like occurred in the thin lithium-air battery.

The containment vessels 1001, 1002, 1003 of thin lithium-air batteries of the embodiments of the present invention includes the sensor 210 in the containment chamber 201. When the reading of the sensor 210 exceeds the predetermined value, the valve 204C is opened and the inert gas is supplied to the inside of the thin lithium-air battery. By having the configuration explained above, the valve provided to the third gas pipe is opened when the sensor detect malfunction, and the inert gas is supplied in the third gas pipe, the thin lithium-air battery, and the fourth gas pipe to purge the inside of the thin lithium-air battery with the inert gas. Accordingly, the explosive reaction can be suppressed.

In the containment vessels 1001, 1002, 1003 of thin lithium-air batteries of the embodiments of the present invention, the sensor 210 is any one of the gas composition sensor, the pressure sensor, and the temperature sensor, or any combination of the above-mentioned sensors. Because of the above-described configuration, when the sensor detects malfunction, the valve provided to the third gas pipe is opened, and the inert gas is supplied in the third gas pipe, the thin lithium-air battery, and the fourth gas pipe to purge the inside of the thin lithium-air battery with the inert gas. Accordingly, the explosive reaction can be suppressed.

In the containment vessels 1001, 1002, 1003 of thin lithium-air batteries of the embodiments of the present invention, the exhausting mechanism is provided to the second gas pipe 202D and the fourth gas pipe 202C. Because of the above-explained configuration, the pressure of the inert gas in the containment chamber can be adjusted by adjusting the exhaustion amount from the second gas pipe. Also, the pressure of the air or oxygen gas in the thin lithium-air battery can be adjusted by adjusting the exhaustion amount from the fourth gas pipe. Accordingly, air or oxygen gas can be supplied stably and efficiently to the thin lithium-air battery contained in the containment vessel filled with the inert gas.

To the containment vessels 1001, 1002, 1003 of thin lithium-air batteries of the embodiments of the present invention, the connecting members 301, 302A, 302B, which connect the thin lithium-air batteries 101, 102 to the third gas pipe 202A and/or the fourth gas pipe 202C, are provided. Because of the above-described configuration, the air or oxygen gas can be supplied stably and efficiently to the thin lithium-air battery contained in the containment vessel filled with the inert gas.

In the containment vessels 1001, 1002, 1003 of thin lithium-air batteries of the embodiments of the present invention, the connecting member 301 includes: the first connecting part 301a connected to the third gas pipe 202A; the second connecting part 301b connected to the fourth gas pipe 202C; the gas flowing part 301d communicated with the first connecting part 301a and the second connecting part 301b; and the battery connecting part 301c connecting the thin lithium-air battery 101. Because of the above-described configuration, the air or oxygen gas can be supplied stably and efficiently to the thin lithium-air battery contained in the containment vessel filled with the inert gas.

In the containment vessels 1001, 1002, 1003 of thin lithium-air batteries of the embodiments of the present invention, the connecting members 302A, 302B include: the third connecting part 302Aa engaging the third gas pipe 202A or the fourth gas pipe 202C; the gas flowing part 302Ad communicated with the third connecting part 302Aa; and the battery connecting part 302Ac connecting the thin lithium-air battery 102. Because of the above-described configuration, the air or oxygen gas can be supplied stably and efficiently to the thin lithium-air battery contained in the containment vessel filled with the inert gas.

In the containment vessels 1001, 1002, 1003 of thin lithium-air batteries of the embodiments of the present invention, the battery connecting part 301c engages the part including the opening 99 of the storage case 91 of the thin lithium-air battery 101. Because of the above-described configuration, the air or oxygen gas can be supplied stably and efficiently to the thin lithium-air battery contained in the containment vessel filled with the inert gas.

In the containment vessels 1001, 1002, 1003 of thin lithium-air batteries of the embodiments of the present invention, the battery connecting part 302Ac engages the cathode supporting material 81 of the thin lithium-air battery 102. Because of the above-described configuration, the air or oxygen gas can be supplied stably and efficiently to the thin lithium-air battery contained in the containment vessel filled with the inert gas.

In the containment vessels 1001, 1002, 1003 of thin lithium-air batteries of the embodiments of the present invention, the connection supporting members 303A, 303B are provided between: the third gas pipe 202A and the fourth gas pipe 202C; and the connecting members 302A, 302B. Because of the above-described configuration, 2 or more of the thin lithium-air batteries can be fixed stably.

In the containment vessels 1001, 1002, 1003 of thin lithium-air batteries of the embodiments of the present invention, the connection supporting members 303A, 303B include: the auxiliary connecting part 303Aa connected to the third gas pipe 202A and the fourth gas pipe 202C; and the member connecting parts 303Ac1, 303Ac2, 303Ac3, 303Ac4 connected to the connecting parts 302A, 302B. Because of the above-described configuration, 2 or more of the thin lithium-air batteries can be fixed stably.

To the containment vessels 1001, 1002, 1003 of thin lithium-air batteries of the embodiments of the present invention, 4 member connecting parts 303Ac1, 303Ac2, 303Ac3, 303Ac4 are provided. Because of the above-described configuration, 4 thin lithium-air batteries can be fixed stably and the battery reaction can be reacted in the state of enhanced safety.

The containment vessels 1001, 1002, 1003 of thin lithium-air batteries of the embodiments of the present invention are not limited by the descriptions of the embodiments of the present invention above, and can be subjected a variety of modification within the scope of the present invention. Specific examples of the embodiments of the present invention are shown below. However, the present invention is not limited by the description of Examples described below.

EXAMPLES

Example 1

Containment Vessel of a Thin Lithium-Air Battery

Figure 18:
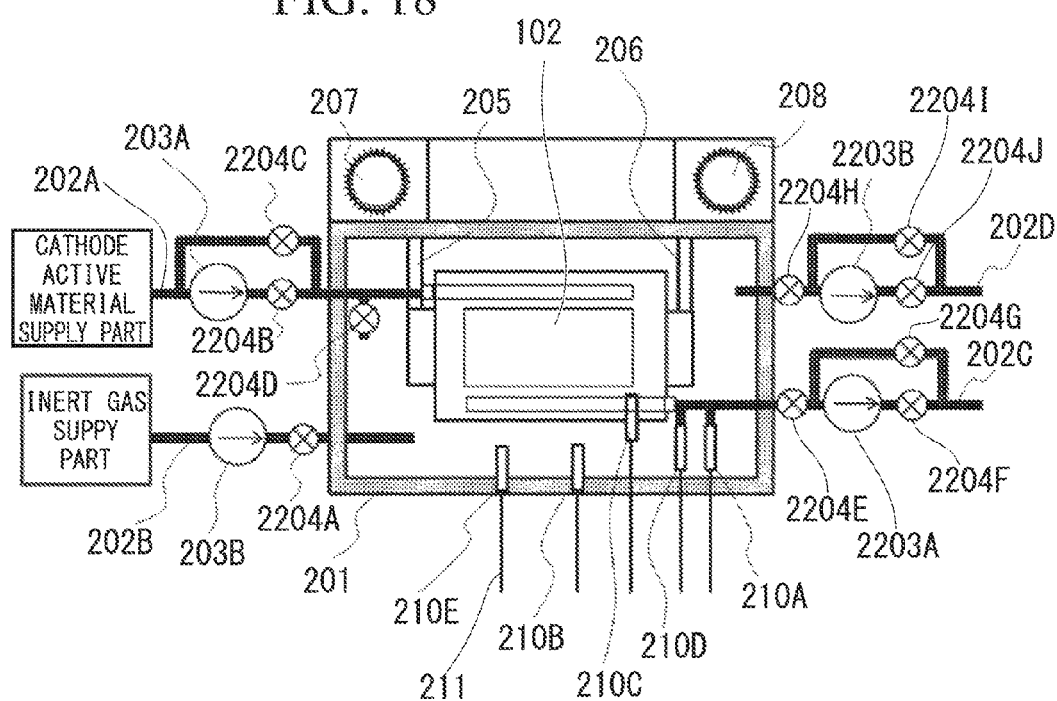
FIG. 18 is a schematic diagram showing the device configuration of Example 1.

FIG. 18 is a schematic diagram showing the device configuration of Example 1.

First, a thin lithium-air battery shown in the second embodiment of the present invention was obtained. As a storage case, a laminate package was used.

Next, the battery was stored in the containment chamber 201 of a shin lithium-air battery with the output terminals 207, 208, after connecting the connection supporting member to each of the third gas pipe 202A and the fourth gas pipe 202C as shown in FIG. 18.

Next, the first gas pipe 202B was connected to the inert gas supply system provided outside of the vessel, and the third gas pipe 202A was connected to the concentrator for oxygen supply (air or oxygen gas supply source: cathode active material supply source) provided to outside of the vessel.

Next, the pumps 203A, 203B, 2203A, 2203B, and the valves 2204A, 2204B, 2204C, 2204D, 2204E, 2204F, 2204G, 2204H, 2204I, 2204J, which were needed for the gas supply/exhaust system, were connected.

Next, the pressure sensor 210D, the temperature sensor 210C, and the gas composition sensor 210A for detecting internal malfunction were connected.

As the gas composition sensor 210A in the oxygen gas flowing passage, the $CO_2$ detector was used, since occurrence of decomposition of the carbohydrate-based electrolyte was foreseen in response to operational malfunctioning.

$CO_2$ detectors were also provided to the main body of the containment vessel of a thin lithium-air battery as the pressure sensor 201E and the gas composition sensor 210B in the vessel. The environment in the inside of the vessel was controlled by the exhaustion pumps 203B, 2203B for exhaustion, and the valves 2204A, 2204H, 2204I, 2204J. It was designed as a system exhausting based on the monitor value of the pressure sensor 210D, 210E, and the explosion-proof valve was added separately (not shown in the drawing). It is possible a defect or operational malfunction occurs in these pressure sensors. Thus, by providing the explosion-proof valve, double safety measures were provided.

[Safety Mechanism of the Containment Vessel of a Thin Lithium-Air Battery]

Next, after supplying the inert gas in the containment chamber 201, the pressure of the inert gas in the containment vessel of the thin lithium-air battery was retained in a predetermined value by operating the pumps and valves.

Next, after supplying air or oxygen gas in the thin lithium-air battery, the pressure of the air or oxygen gas in the thin lithium-air battery 102 was retained in a predetermined value by operating the pumps and valves.

Under the condition described above, the battery reaction was performed.

During normal discharging, in order to avoid the state where the oxygen supply was the rate-limiting step, a pressurized state was retained by controlling opening and closing of the cut valve and the squeeze pump 203A while monitoring the pressure in the oxygen gas flowing passage with the pressure sensor 210D.

An emergency response system was provided to the containment vessel 201 of the thin lithium-air battery (omitted in the drawing). When malfunctioning occurred in the containment vessel 201 of the thin lithium-air battery, it switches to the emergency-response-mode operation.

Specifically, during discharging and charging, it switches to the operation of the emergency-response-mode 1 once any one of temperature increase in the temperature sensor 210C provided on the surface of the stacked laminate package, abnormal pressure in the oxygen gas flowing passage in the laminate package (detected by the pressure sensor 210D), and abnormal gas composition in the oxygen gas flowing passage (detected by the $CO_2$ sensor 210A) occurs. In the case where any one of the abnormal pressure of main body of the containment vessel (detected by the pressure sensor 210E) and the abnormal gas composition in the main body of the containment vessel (detected by the $CO_2$ sensor 210B) was detected too, it switches to the emergency-response mode 2.

Figure 19:
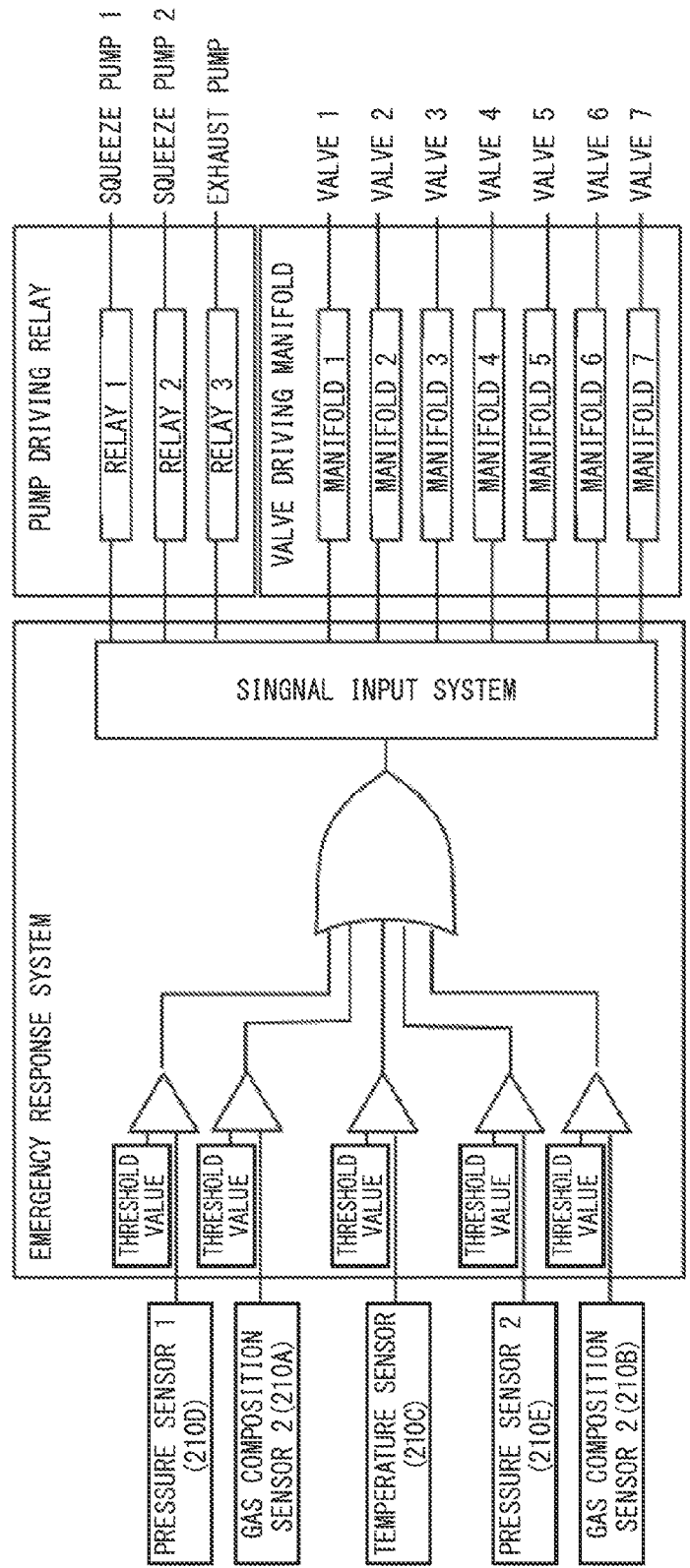
FIG. 19 is a schematic diagram of the malfunction detection system of Example 1.

FIG. 19 is a schematic diagram of the malfunction detection system of Example 1. FIG. 19 shows operation sequences to respond to the malfunction output from each sensor in the emergency response system.

As shown in FIG. 19, it was configured that when the analog signal of each of sensors, which was input to the emergency response system, exceeded the predetermined threshold values, on-off operation was performed of the squeeze pumps 1, 2 and the exhaust pump in the relays 1 to 3 for the pump driving (electromagnetic), and opening and closing operation of the valves 1 to 7 was performed in the valve driving manifolds 1 to 7.

Table 1 indicates the operation sequences of each of supply apparatuses, pumps, and valves. The mode 1 and the mode 2 are shown for four different situations: in normal discharging; in abnormal discharging; in normal charging; and in abnormal charging. The mode 1 is for the case where there is no abnormality in the containment vessel. The mode 2 is for the case where there abnormality is detected in the inside of the containment vessel.

TABLE 1

| Symbols | Name | Detailed name | Normal discharging | Abnormal discharging Mode 1 | Abnormal discharging Mode 2 | Normal charging | Abnormal charging Mode 1 | Abnormal charging Mode 2 |
|---|---|---|---|---|---|---|---|---|
|  | Cathode active material supply part | Oxygen concentrator (intake) | ON | OFF | OFF | OFF | OFF | OFF |
| 203A | Squeeze pump 2 | Oxygen squeeze pump | ON | OFF | OFF | OFF | OFF | OFF |
| 2204C | Valve 3 | Cut valve 1 for cathode active material | CLOSE | CLOSE | CLOSE | CLOSE | CLOSE | CLOSE |
| 2204B | Valve 2 | Cut valve 2 for cathode active material | CLOSE | CLOSE | CLOSE | CLOSE | CLOSE | CLOSE |
| 2204D | Valve 4 | Vent valve for cathode active material | CLOSE | OPEN | OPEN | CLOSE | OPEN | OPEN |
|  | Inert gas supply part | Nitrogen concentrator or noble gas source | ON | ON | ON | ON | ON | ON |
| 203B | Squeeze pump 1 | Nitrogen/noble gas squeeze pump | ON | ON | ON | ON | ON | ON |
| 2204A | Valve 1 | Nitrogen/noble gas cut valve | OPEN | OPEN | OPEN | OPEN | OPEN | OPEN |
| 2204E | Valve 5 | Battery exhaust gas passage cut valve 1 | CLOSE | OPEN | OPEN | OPEN | OPEN | OPEN |
| 2203A | Exhaust pump 1 | Force exhaust pump for battery exhaust gas | OFF | ON | ON | ON | ON | ON |

TABLE 1-continued

| Symbols | Name | Detailed name | Normal discharging | Abnormal discharging Mode 1 | Abnormal discharging Mode 2 | Normal charging | Abnormal charging Mode 1 | Abnormal charging Mode 2 |
|---|---|---|---|---|---|---|---|---|
| 2204G | Valve 7 | Battery exhaust gas passage cut valve 2 | CLOSE | CLOSE | CLOSE | CLOSE | CLOSE | CLOSE |
| 2204F | Valve 6 | Battery exhaust gas passage cut valve 3 | CLOSE | OPEN | OPEN | OPEN | OPEN | OPEN |
| 2203B | Exhaust pump 2 | Force exhaust pump for vessel exhaust gas | OFF | OFF | ON | OFF | OFF | ON |
| 2204H | Valve 8 | Vessel exhaust gas passage cut valve 1 | CLOSE | CLOSE | OPEN | CLOSE | OPEN | OPEN |
| 2204I | Valve 9 | Vessel exhaust gas passage cut valve 2 | CLOSE | CLOSE | CLOSE | OPEN | OPEN | CLOSE |
| 2204J | Valve 10 | Vessel exhaust gas passage cut valve 3 | CLOSE | CLOSE | OPEN | OPEN | OPEN | OPEN |

The basic action during malfunctioning was: stopping the oxygen concentrator and the squeeze pump; and closing and opening operation of the cut valve.

Specifically, the basic action during the malfunctioning in the mode 1 was: stopping the squeeze pump 2 by using the relay 2 for pump driving (electromagnetic); closing the valve 2 in the valve driving manifold 2; and opening operation of the valve 4 in the valve driving manifold 4. The exhaust pump 1 operated continuously.

As the supply-system of the inert gas, the squeeze pump 1 was operated in the relay 1 for pump driving (electromagnetic) and the valve 1 was retained in the opened state in the valve driving manifold 1.

As the exhaust gas-system, the valve 5 was opened in the valve driving manifold 5, the valve 6 was also opened in the valve driving manifold 6, and the exhaust pump was operated. In the mode 1, the valve 8 was retained in the closed state since it is the malfunction in the inside of the thin lithium-air battery. By following the operations describe above, the partial pressure of oxygen in the thin lithium-air battery was reduced immediately and the dangerous situation where ignition, explosion, or the like was uncontrolled was avoided.

It was switched to the mode 2 by the abnormality detected by the pressure sensor 2 or the gas composition sensor 2 in the containment vessel. In this case, exhausting the inside of the containment vessel is also necessary. Thus, in addition to the operation in the mode 1, the valve 8 was opened in the valve driving manifold 8, the valve 10 was opened in the valve driving manifold 10, and the exhausting pump 2 was operated. By following the operations describe above, the insides of the thin lithium-air battery and the containment vessel were substituted with the inert gas at the same time, and the dangerous situation such as ignition was avoided.

INDUSTRIAL APPLICABILITY

The present invention relates to a containment vessel of a thin lithium-air battery capable of suppressing a rapid exothermic oxidation reaction (ignition) during operation and improving the safety. Thus, the present invention has applicability for the battery industry, the energy industry, or the like.

BRIEF DESCRIPTION OF THE REFERENCE SYMBOLS

15A: Hole
73: Sealing film
80: Stacked body
81: Cathode supporting material
82: Cathode material
83: Separator
84: Anode supporting material
85: Anode material
86: Thin cathode structure
87: Thin anode structure
88: Unit structure
91: Storage case
96: Tab connecting member
97, 98: Tab
99: Opening
100: Dividing wall film
101, 102: Thin lithium-air battery
201: Containment chamber
202A: Third gas pipe
202B: First gas pipe
202C: Fourth gas pipe
202D: Second gas pipe
202E: Fifth gas pipe
203A, 203B: Squeeze pump
204A, 204B, 204C: Valve
205, 206: Blade
207, 208: Output terminal
210: Sensor
211: Wiring
301: Connecting member
301a: First connecting part
301b: Second connecting part
301c: Battery connecting part
301d: Gas flowing part
302A: Connecting member
302Aa: Third connecting part
302Ac: Battery connecting part
302Ad: Gas flowing part
302B: Connecting member
303A: Connection supporting member
303Aa: Auxiliary connecting part
303Ac1, 303Ac2, 303Ac3, 303Ac4: member connecting part
303Ad: Gas flowing part
303B: Connection supporting member
1001, 1002, 1003: Containment vessel of a thin lithium-air battery
2201: Containment vessel
2202A, 2202B: Gas pipe
2203A, 2203B: Pump 2204A, 2204B, 2204C, 2204D, 2204E, 2204F, 2204G, 2204H, 2204I, 2204J: Valve
2205, 2206: Blade
2207, 2208: Output terminal

The invention claimed is:

1. A containment vessel of a lithium-air battery in which a containment chamber for containing the lithium-air battery is formed, the containment vessel comprising:
   a first gas pipe communicated with the containment chamber, through which an inert gas is supplied to the containment chamber;
   a second gas pipe communicated with the containment chamber, through which the inert gas is exhausted from the containment chamber;
   a third gas pipe communicated with the lithium-air battery contained in the containment chamber, through which an air or oxygen gas is supplied to a cathode material of the lithium-air battery to perform a battery reaction of the air or oxygen gas with lithium ions in an electrolyte of the battery;
   a fourth gas pipe communicated with the lithium-air battery contained in the containment chamber, through which the air or oxygen gas is exhausted from the lithium-air battery; and
   a valve that is provided to the third gas pipe and controls opening and closing of communication to the containment chamber, wherein
   an inert gas supply source is provided to the first gas pipe,
   an air or oxygen gas supply source is provided to the third gas pipe, and
   by opening the valve provided to the third gas pipe, the inert gas in the containment vessel is provided to the cathode material of the lithium air battery through the third gas pipe.

2. The containment vessel of a lithium-air battery according to claim 1, wherein
   a sensor is provided to the inside of the containment chamber, and
   the valve is opened when a reading of the sensor exceeds a predetermined threshold value to supply an inert gas to the inside of the lithium-air battery.

3. The containment vessel of a lithium-air battery according to claim 2, wherein the sensor is any one of: a gas composition sensor; a pressure sensor; and a temperature sensor, or any combination thereof.

4. The containment vessel of a lithium-air battery according to any one of claims 1 to 3, wherein an air exhaust mechanism comprising a pump is provided to each of the second gas pipe and the fourth gas pipe.

5. The containment vessel of a lithium-air battery according to claim 1, wherein a connecting member connecting: at least any one of the third gas pipe and the fourth gas pipe; and the lithium-air battery, is provided.

6. The containment vessel of a lithium-air battery according to claim 5, wherein the connecting member comprises:
   a first connecting part that connects to the third gas pipe;
   a second connecting part that connects to the fourth gas pipe;
   a gas flowing part that connects to the first connecting part and the second connecting part; and
   a battery connecting part that connects the lithium-air battery.

7. The containment vessel of a lithium-air battery according to claim 5, wherein the connecting member comprises:
   a third connecting part that engages the third gas pipe or the fourth gas pipe;
   a gas flowing part that connects to the third connecting part; and
   a battery connecting part that connects the lithium-air battery.

8. The containment vessel of a lithium-air battery according to claim 5 or 6, wherein the battery connecting part engages a part containing an opening of a storage case of the lithium-air battery.

9. The containment vessel of a thin lithium-air battery according to claim 5, wherein the battery connecting part engages a cathode supporting material of the thin lithium-air battery.

10. The containment vessel of a lithium-air battery according to claim 5, wherein a connection supporting member is provided between: the third gas pipe and the fourth gas pipe; and the connecting member.

11. The containment vessel of a lithium-air battery according to claim 10, wherein the connection supporting member comprises: an auxiliary connecting part that connects to the third gas pipe or the fourth gas pipe; and a member connecting part that connects to the connecting member.

12. The containment vessel of a lithium-air battery according to claim 11, wherein two or more member connecting parts are provided.

13. A battery comprising:
   a containment vessel of a lithium-air battery; a containment chamber provided to an inside of the containment vessel of the lithium-air battery; and a lithium-air battery contained in the containment chamber, wherein
   the containment vessel of the lithium-air battery comprises:
     a first gas pipe communicated with the containment chamber, through which an inert gas is supplied to the containment chamber;
     a second gas pipe communicated with the containment chamber, through which the inert gas is exhausted from the containment chamber;
     a third gas pipe communicated with the lithium-air battery contained in the containment chamber, through which an air or oxygen gas is supplied to a cathode material of the lithium-air battery to perform a battery reaction of the air or oxygen gas with lithium ions in an electrolyte of the battery;
     a fourth gas pipe communicated with the lithium-air battery contained in the containment chamber, through which the air or oxygen gas is exhausted from the lithium-air battery; and
     a valve that is provided to the third gas pipe and controls opening and closing of communication to the containment chamber, wherein
     an inert gas supply source is provided to the first gas pipe,
     an air or oxygen gas supply source is provided to the third gas pipe, and
     by opening the valve provided to the third gas pipe, the inert gas in the containment vessel is provided to the cathode material of the lithium air battery through the third gas pipe, and wherein
   the lithium-air battery includes a cathode structure in which a cathode material made of a porous body is bonded to a cathode supporting material in a plate shape, and
   a gas flow path, which leads from one side surface of the cathode supporting material or the cathode material to other side surface facing the one side surface, is formed.

14. The battery according to claim 13, wherein the gas flow path is a passage, which leads from the one side surface of the cathode supporting material to the other side surface facing the one side surface.

15. The battery according to claim 13, wherein the gas flow path is a passage, which leads from the one side surface of the cathode material to the other side surface facing the one side surface.

* * * * *

UNITED STATES PATENT AND TRADEMARK OFFICE
CERTIFICATE OF CORRECTION

PATENT NO. : 9,564,645 B2
APPLICATION NO. : 14/358885
DATED : February 7, 2017
INVENTOR(S) : Kimihiko Ito et al.

It is certified that error appears in the above-identified patent and that said Letters Patent is hereby corrected as shown below:

In the Specification

Column 2, Line 56:
Now reads: "The safely of the..."
Should read: --The safety of the...--

Column 16, Line 67:
Now reads: "...a shin lithium..."
Should read: --...a thin lithium...--

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*